United States Patent [19]
Allebach et al.

[11] Patent Number: 5,544,284
[45] Date of Patent: *Aug. 6, 1996

[54] SEQUENTIAL PRODUCT CODE QUANTIZATION OF DIGITAL COLOR IMAGE

[75] Inventors: Jan P. Allebach; Charles A. Bouman; Thyagarajan Balasubramanian, all of West Lafayette, Ind.

[73] Assignee: Eastman Kodak Company, Rochester, N.Y.

[ * ] Notice: The term of this patent shall not extend beyond the expiration date of Pat. No. 5,432,893.

[21] Appl. No.: 833,529

[22] Filed: Feb. 11, 1992

[51] Int. Cl.$^6$ .................................................. G06F 15/00
[52] U.S. Cl. ............................................................. 395/131
[58] Field of Search ...................................... 395/131, 128, 395/127; 364/200 MS File, 900 MS File; 382/164, 169, 234, 235, 255, 258

[56] References Cited

U.S. PATENT DOCUMENTS

| | | | |
|---|---|---|---|
| 5,047,842 | 9/1991 | Bouman et al. | 358/75 |
| 5,142,615 | 8/1992 | Levesque et al. | 395/131 |
| 5,241,624 | 8/1993 | Torres | 395/129 |
| 5,260,873 | 11/1993 | Hishinuma | 364/413.22 |
| 5,265,200 | 11/1993 | Edgar | 395/131 |
| 5,327,509 | 7/1994 | Rich | 382/17 |
| 5,335,318 | 8/1994 | Kirk | 395/131 |
| 5,359,702 | 10/1994 | Mukai | 395/109 |
| 5,428,465 | 6/1995 | Kanamori et al. | 358/518 |
| 5,432,893 | 7/1995 | Blasubramanian et al. | 395/131 |

OTHER PUBLICATIONS

B. W. Kolpaik and C. Bouman, "Color Palette Design for Error Diffusion".

P. Heckbert, "Color Image Quantization for Frame Buffer Display"; *Computer Graphics*, vol. 16, No. 3, pp. 297–307, Jul. 1982.

G. Braudaway, "A Procedure for Optimum Choice of a Small Number of Colors from a Large Color Palette for Color Imaging"; *Electronic Imaging '87*, San Francisco, CA, 1987.

R. S. Gentile, J. P. Allebach and E. Walowit, "Quantization of Color Images Based on Uniform Color Spaces", *Journal of Imaging Technology*, vol. 16, No. 1, pp. 12–21, Feb. 1990.

Y. Linde, A. Buzo, and R. M. Gray, "An Algorithm for Vector Quantizer Design", *IEEE Trans. Commun..*, vol. COM-28, pp. 84–95, Jan. 1980.

Sudhir S. Dixit, "Quantization of Color Images for Display/Printing on Limited Color Output Devices", *Comput. & Graphics*, vol. 15, No. 4, pp. 561–567, 1991.

(List continued on next page.)

*Primary Examiner*—Phu K. Nguyen
*Attorney, Agent, or Firm*—Peyton C. Watkins

[57] ABSTRACT

A digital color image quantization mechanism employs sequential product code vector quantization, to sequentially extract chrominance and luminance values from the vectors and quantizes chrominance and luminance features based upon a conditional distribution of these features within partitioned regions of chrominance/luminance color space. The mechanism sequentially partitions a histogram of the original digital color image in luminance, chrominance (Y,Cb,Cr) space coordinates into a plurality of sub-regions or color space cells, such that each partitioned color cell is associated with a color of the output palette through which the color composition of a reproduced color image is defined. A splitting criterion determines the sequential order of partitioning of an axis. Because of the increased sensitivity of the human visual system to contouring artifacts in regions of an image to low spatial activity, the splitting criterion along the luminance axis is scaled or weighted in inverse proportion to the average spatial activity of the luminance-chrominance region subject to be split. A map of chrominance and luminance output codes is generated for the respective pixels of the output color image in accordance with the axial splitting or quantization of the chrominance and luminance components of the histogram.

80 Claims, 12 Drawing Sheets

OTHER PUBLICATIONS

R. Balasubramanian and J. P. Allebach, "A New Approach to Palette Selection for Color Images", *Journal of Imaging Technology*, vol. 17, No. 6, pp. 284–290, Dec. 1991.

W. H. Equitz, "A New Vector Quantization Clustering Algorithm", *IEEE Trans. Acoust., Speech, Signal Processing*, vol. 37, No. 10, pp. 1568–1575, Oct. 1989.

S. J. Wan, P. Prusinkiewicz, and S. K. M. Wong, "Variance–Based Color Image Quantization for Frame Buffer Display", *Color Research and Applications*, vol. 15, No. 1, pp. 52–58, Feb. 1990.

M. T. Orchard and C. A. Bouman, "Color Quantization of Images", *IEEE Trans. Signal Processing*, vol. 39, No. 12, pp. 2677–2690, Dec. 1991.

T. D. Lookabaugh and R. M. Gray, "High–Resolution Quantization Theory and the Vector Quantizer Advantage", *IEEE Trans. Inform. Thy.*, vol. 35, No. 5, pp. 1020–1033, Sep. 1989.

R. Balasubramanian, C. A. Bouman and J. P. Allebach, "New Results in Color Image Quantization", *Proceedings of the 1992 SPIE/SPSE Symposium on Electronic Imaging—Science and Technology*, San Jose, CA, Feb. 10–13, 1992.

A. Gersho, R. M. Gray, *Vector Quantization and Signal Compression*, Kluwer Academic Publishers, 1991.

J. Makhoul, S. Roucos, and H. Gish, "Vector Quantization in Speech Coding", *Proc. IEEE*, 73, 1551–1588 (1985).

James M. Kasson and Wil Plouffe, "An Analysis of Selected Computer Interchange Color Spaces", submitted to *Computer Graphics*.

N. M. Nasrabadi and R. A. King, "Image Coding Using Vector Quantization: A Review", *IEEE Trans. Commun.* vol. COM–36, pp. 957–971, Aug. 1988.

A. Gersho, "Asymptotically Optimal Block Quantization", *IEEE Trans. Inform. Thy.*, vol. IT–25, pp. 373–380, Jul., 1979.

S. Na and D. L. Neuhoff, "Bennett's Integral for Vector Quantizers, and Applications", *1990 IEEE Int'l Symposium on Information Theory*, Jan. 1990.

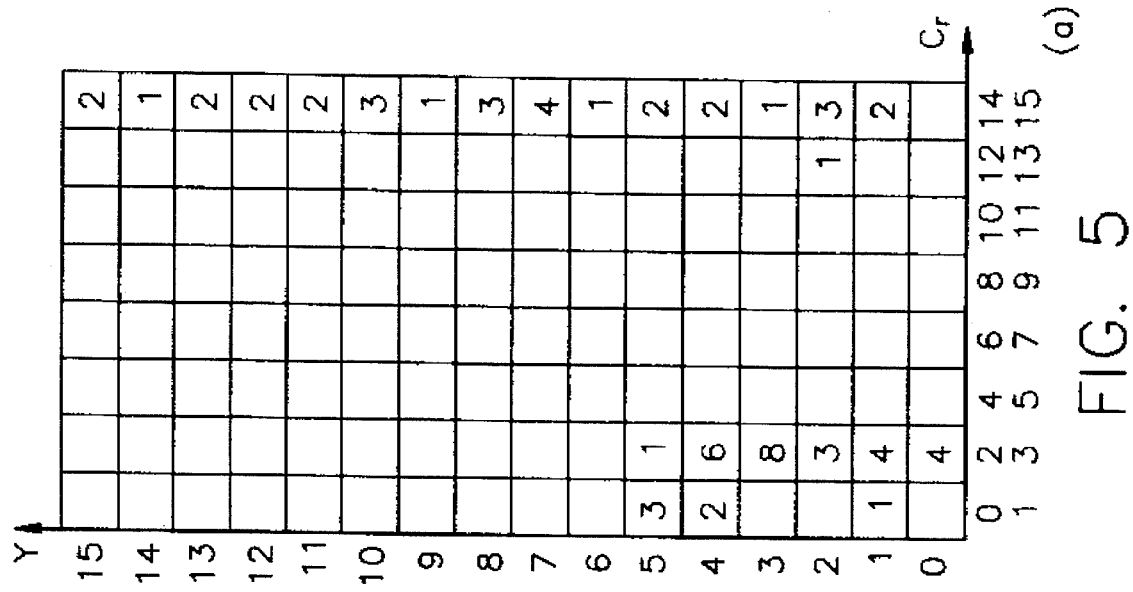

| Count → | 6 | 26 | 0 | 0 | 0 | 0 | 1 | 31 |
|---|---|---|---|---|---|---|---|---|

$C_r$ Value → 0,1   2,3   4,5   6,7   8,9   10,11   12,13   14,15

| REGION | LABEL FROM Y LUT | OUTPUT Y VALUE | OUTPUT $C_r$ VALUE |
|---|---|---|---|
| $C_{r1-1a}$ | 0 | 0.92 | 1.92 |
| $C_{r2-1}$ | 3 | 4.68 | 14.0 |
| $C_{r2-2}$ | 4 | 11.92 | 14.0 |
| $C_{r1-2}$ | 2 | 4.33 | 1.83 |
| $C_{r1-1b}$ | 1 | 3.0 | 2.13 |

SEQUENTIAL PRODUCT CODE QUANTIZATION OF DIGITAL COLOR IMAGE

FIELD OF THE INVENTION

The present invention relates in general to digital color image processing, and is particularly directed to a mechanism for quantizing a digital color image having a relatively high color encoding precision into a 'palette' of color codes that may be stored in a relatively low data resolution color image memory, the contents of which are employed to reproduce an output color image having a high quality that is pleasing to the human visual system.

BACKGROUND OF THE INVENTION

Many color image output devices which are driven by digital color image databases employ an image frame buffer the capacity of which is considerably less than that of the encoding resolution into which an original color image has been digitized by a color opto-electronic imaging device, such as a high precision digitizing color camera. A typical example of this mismatch in data precision is the use of an eight bit frame buffer in association with a color image output device, such as a color display monitor, to store a digital color image having a data precision of-twenty-four bits (eight bits per color per pixel).

Since the output device (e.g. color display) usually has a resolution of eight bits per color at the input of each of three respective digital-to-analog converters which drive its red, green and blue signal ports, it is possible for the output device to replicate any of the colors within the original image, as long as a code representative of that particular color is stored in the frame buffer. Unfortunately, in the previous example, the limited capacity of the frame buffer means that only 256 out of 16 million possible colors codes are available to define the original digital color image may be stored. As a consequence, it is necessary to generate a color conversion mechanism through which each of the colors of the original input image (e.g. out of a possibility of $2^{24}=1.6\times10^7$ colors) is effectively transformed into one of a lesser number of output colors (e.g. $2^8=256$ colors) for driving the display.

Color conversion quantization has been the fundamental technique for reducing the color code resolution of the original color image size to a limited palette of color codes that can be accommodated by the frame buffer and which are selected to as faithfully as possible replicate the color characteristics of the original image. Color conversion quantization typically has involved some form of vector quantization and operates to minimize an objective error criterion (usually mean squared error).

One class of quantization techniques, as described in articles by P. Heckbert, entitled "Color image quantization for frame buffer display," Computer Graphics, Vol. 16, No.3, pp 297–307, July 1972, G. Braudaway, entitled "A procedure for optimum choice of a small number of colors from a large color palette for color imaging," Electronic Imaging '87, San Francisco Calif., 1987 and R. Gentile et al entitled "Quantization of color images based on uniform color spaces," Journal of Imaging Technology, Vol. 16, No. 1, pp.12–21, Feb 1990, selects an initial color palette and iteratively refines it using the algorithm described in an article by Y. Linde et al, entitled "An algorithm for vector quantizer design," IEEE Transactions on Communications, Vol. COM-28, pp 84–95, Jan. 1980. While these vector quantization mechanisms yield high quality images, they are very computationally intensive.

Another approach, described in an article by R. Balasubramanian et al, entitled "A new approach to palette selection for color images," Journal of Imaging Technology, Vol. 17, No. 6, pp.284–290, Dec. 1991, and based upon a clustering vector quantization technique proposed in an article by W. Equitz entitled "A new vector quantization algorithm," IEEE Transactions on Acoustics, Speech, Signal Processing, Vol. 37, No. 10, pp 1568–1575, Oct. 1989, starts with all of the colors of an image and groups colors into clusters by merging one nearest neighbor pair of clusters at a time until the number of clusters equals the desired number of palette colors. The centroids of the clusters are selected as the palette colors. Tree structures are used to perform efficient nearest neighbor searches. In addition, this scheme employs histogramming to reduce the number of initial colors and a spatial activity weighting to take into account the sensitivity of the human visual system to quantization errors in relatively 'smooth' regions of the image.

A third class of vector quantization algorithms uses splitting techniques to divide the color space into smaller sub-regions and selects a representative palette color from each sub-region. In general, splitting techniques are computationally more efficient than either the iterative or merging techniques and can provide a structure to the color space that enables efficient pixel mapping at the output.

One of these splitting techniques, termed a 'median cut' algorithm, recursively splits a region into two subregions by locating a plane perpendicular to the coordinate axis having the greatest range (where the range is the difference between the maximum and minimum values of that coordinate) and which passes through the median point of that coordinate axis.

A second splitting technique is a variance-based algorithm which splits the region having the largest total squared error (TSE). Data points are projected onto each of the coordinate axes and the projected TSEs computed. The region is then split along that axis yielding the smallest sum of projected TSEs from the two resulting sub-regions. For a detailed discussion of the variance splitting algorithm attention may be directed to an article by S. Wan et al, entitled "Variance based color image quantization for frame buffer display" COLOR Research and Applications, Vol. 15, No. 1, pp 52–58 Feb. 1990.

A third splitting algorithm, which is the most optimal in a quantitative sense, is the binary splitting algorithm. The binary splitting algorithm passes a splitting plane through the centroid of all the colors of the region such that the splitting plane is oriented perpendicular to the direction of maximum total squared variation. The latter is derived from the principal eigenvalue and eigenvector of the covariance matrix of the data in that region. At each step the region to be split is that with the largest associated principal eigenvalue. The binary splitting algorithm also incorporates spatial activity measures to enhance the subjective quality of the image. For a detailed discussion of the binary splitting algorithm attention may be directed to an article by M. Orchard et al, entitled "Color quantization of images", IEEE Transactions on Signal Processing Vol. 39, No. 12, pp 2677–2690, Dec. 1991.

SUMMARY OF THE INVENTION

The present invention is directed to a reduced computational complexity digital color image quantization mechanism which employs a sequential product code form of vector quantization, to sequentially extract chrominance and luminance values from the vectors and quantize chrominance and luminance features based upon a conditional distribution of these features within partitioned regions of chrominance/luminance color space. The present invention is particularly intended to quantize a relatively high data resolution digital color image, such as the twenty-four bit per pixel digitized color image output by a digitizing color camera, into a reduced, practical number or 'palette' of eight bit color codes that are to be stored within the limited capacity memory of the frame buffer-associated with an output device for reproducing the original digital color image. Even though the frame buffer has a considerably reduced storage capacity (eight bits per pixel versus twenty-four bits per pixel of the original digital color image), the palette codes chosen by the sequential product code image quantizing mechanism in accordance with the invention are those that effectively prevent the generation of contouring artifacts in the reproduced image and provide an output image having a quality that is pleasing to the human visual system.

The sequential product code vector quantization mechanism sequentially partitions a digital image color space (e.g. a luminance, chrominance color space) with respect to its vector coordinate system (e.g. (Y,Cb,Cr) space coordinates) into a plurality of color space subregions or color space cells, such that each partitioned color cell is associated with a color of the output palette through which the color composition of a reproduced color image is defined. At a first step of the partitioning process, the color space (e.g. histogram in luminance, chrominance (Y, Cb, Cr) color space coordinates) is subdivided into a plurality of parallel slices along a selected first of its color space axes, such as along one of the Cr and Cb chrominance axes. This subdivision of the color space is preferably accomplished by performing a sequential binary splitting of an axis, either at a prescribed number of axial splitting locations, or adaptively in dependence upon a performance measure of the results of successive splits, such as a mean squared error criterion. Where the initial split of the (Y, Cb, Cr) color space is to take place along one of the chrominance axes, which of the two Cb, Cr axes is chosen to begin the sequential splitting process is that chrominance axis (Cb or Cr) a split of which realizes a larger reduction in total squared error (TSE).

Whenever the color space is to be partitioned along one of its coordinate axes, a splitting criterion is employed to determine the sequential order of partitioning of the axis. The splitting criterion is equal to the product of the number of data values projected upon the segment of the axis to be split and the variance of the data along that segment of the axis. The segment of the axis having the largest splitting criterion is split first. After that segment has been split into two sub-segments, respective splitting criteria are then computed for the sub-segments and compared with the splitting criteria for all other segments of the axis. Again, that segment (or subsegment) of the axis having the largest splitting criterion is split next. This process is repeated either until the axis has been partitioned into the number of splits initially assigned to it or, in the case of adaptive partitioning, until or adaptively in dependence upon an 'on-the-fly' performance measure (e.g. mean squared error criterion) of the results of successive splits during the splitting process.

Because of the increased sensitivity of the human visual system to low spatial activity, where the color space is defined in terms of luminance, chrominance coordinates, the splitting criterion along the luminance axis is scaled or weighted in inverse proportion to the average spatial activity of the region subject to be split. Thus, a region of lower spatial activity will have a higher weighting value, which is intended to emphasize a region of lower spatial activity, where contouring artifacts are a potential problem.

The number of splits along each respective axis will determine the number of regions or 'cells' into which the histogram color space is subdivided, and thereby determines the number of colors of the palette. For a conventional eight bit frame buffer, the total number of available palette codes is 256. From a practical standpoint, for representative sets of color images to which the present invention has been applied, it has been found that each of the chrominance axes Cr and Cb may be split at seven or eight locations, while there may be on the order of 240 splits of the partitioned chrominance regions into luminance-chrominance subregions. This large number of splits along the luminance axis has been found to effectively eliminate objectionable contouring artifacts, thereby resulting in a high quality image that is pleasing to the human visual system.

The locations along a color space coordinate where partitioning is to occur are defined in accordance with a preselected splitting control function. Where binary splitting is employed to partition the color space, each split location along an axis may correspond to the centroid or mean value of the color space population as projected onto the segment of that axis. At each binary split location along an axis, the color space (e.g. a luminance, chrominance histogram) is partitioned by a plane which is perpendicular to the axis and passes through the mean value of the color space population as projected onto that axis.

Thus, in the case of a luminance, chrominance color space (histogram), binary splitting of a first chrominance axis, such as the Cb axis, produces a set of color space 'slices' each of which is associated with a quantization code value of the selected chrominance coordinate. Namely, the digital value of the first chrominance coordinate of any pixel of the original digital color image will be quantized to a code value used to identify the slice in which that digital value occurs.

After the color space (luminance, chrominance histogram) has been split into a plurality of color space slices along the first chrominance axis, each of these slices is iteratively split into a plurality of column or strip-shaped luminance-chrominance regions along the second chrominance axis, by performing a binary splitting of the second axis at a number of axial locations, that may be prescribed or determined adaptively, as noted earlier. Again, where binary splitting is employed to partition the color space, each split location along the second (chrominance) axis preferably corresponds to the centroid or mean value of the color space population of a respective one of the slices resulting from the first split as projected onto the second chrominance axis.

The strip-shaped luminance-chrominance regions resulting from the second chrominance axis split effectively represent quantization code values associated with the second chrominance component. Namely, the digital value of the second chrominance component of any pixel of the original digital color image will be quantized to a code value used to identify the partitioned luminance-chrominance column in which that digital value occurs.

For a luminance, chrominance color space (histogram), where the chrominance axes are partitioned first, the resulting column or strip-shaped luminance-chrominance regions are then sequentially partitioned into a plurality of luminance-chrominance sub-regions by performing a binary splitting of the luminance axis. Each split location along the luminance axis corresponds to the centroid or mean value of the color space population within the column as projected onto the segment of the luminance axis. At each binary split location along the luminance axis, the color space is partitioned by a plane which is perpendicular to the luminance axis and passes through the mean value of the column of color space population as projected onto the luminance axis. Luminance axis partitioning is sequentially repeated until the total number of cells (partitioned luminance-chrominance subregions) corresponds to the desired number of palette colors. The luminance-chrominance sub-regions resulting from the luminance axis split effectively represent quantization code values associated with the luminance component. Namely, the digital value of the luminance component of any pixel of the original digital color image will be quantized to a code value used to identify the partitioned luminance-chrominance sub-region in which that digital value occurs.

After the quantization of the (Y,Cr,Cb) color space, the luminance (Y) and chrominance (Cr, Cb) codes are reconverted back into respective R, G and B code values. For this purpose, a video memory in which palette color labels are stored may be coupled to a look-up table which generates RGB values associated with the palette color labels. The RGB outputs from the look-up table are applied to respective D-A converters associated with the RGB ports of an image output device.

BRIEF DESCRIPTION OF THE DRAWINGS

FIG. 5 is a two-dimensional histogram of the pixel population of the matrices of FIGS. 2 and 3;

FIG. 6 is a color activity diagram generated in accordance with the histogram of FIG. 5 and variation values of FIG. 4;

DETAILED DESCRIPTION

Figure 1:
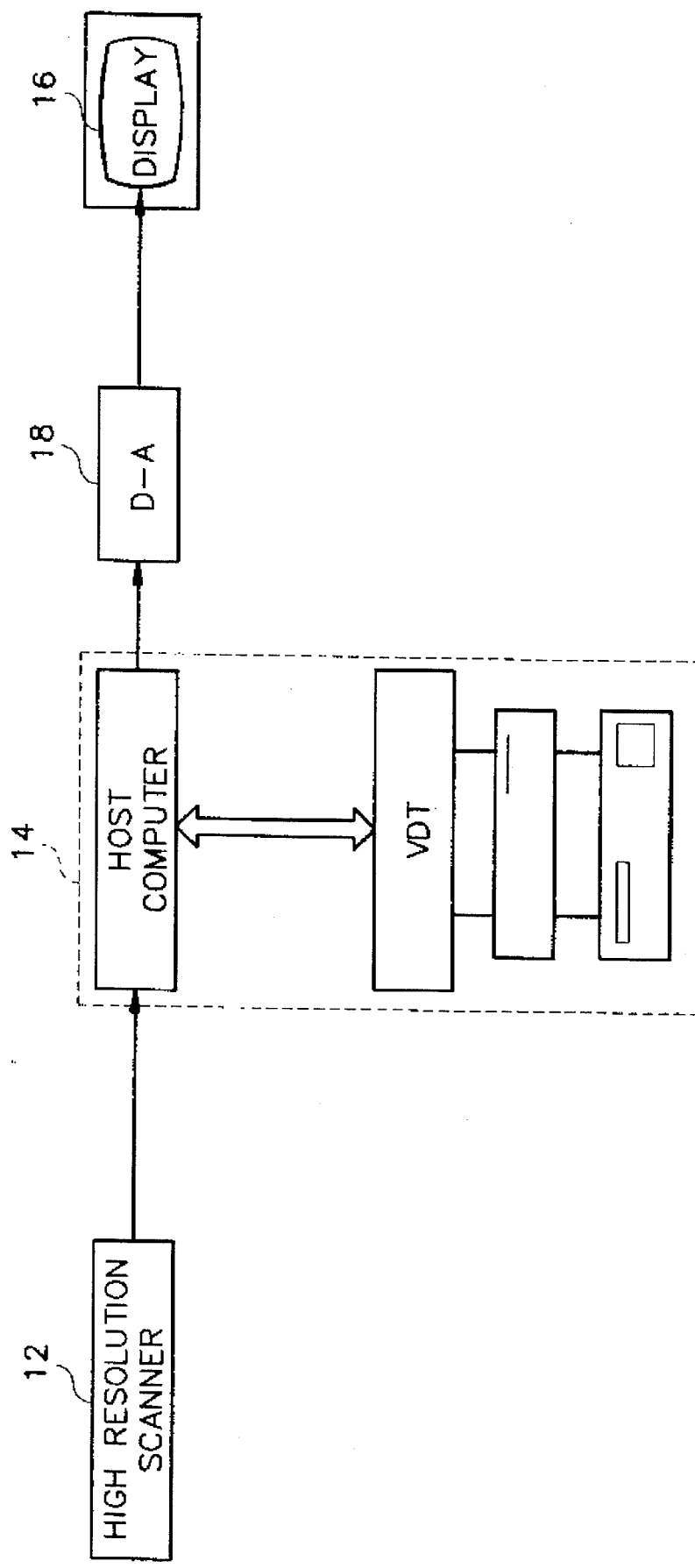
FIG. 1 diagrammatically illustrates an example of a color image processing system in which the quantization mechanism of the present invention may be employed.

Before describing in detail the digital color image quantization mechanism in accordance with the present invention, it should be observed that the present invention resides primarily in What is effectively a prescribed digitized image transformation operator which may, but need not necessarily, be incorporated within the image processing software employed by a digital color image processing system. Consequently, the configuration of such a system and the manner in which it is interfaced with a digital image color source (e.g. a digitizing high precision (e.g. twenty-four bits per pixel) color imagery scanner) and a color image output device (e.g. eight bits per pixel color display) have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations and the image processing diagrams of the Figures are primarily intended to illustrate the major components of the system in a convenient functional grouping, and an example of the application of the image processing operators of the present invention to an illustrative example, whereby the present invention may be more readily understood.

FIG. 1 diagrammatically illustrates an example of a color image processing system in which the quantization mechanism of the present invention may be employed. The exemplary system comprises a high color precision opto-electronic color image digitizing scanner 12, the output of which is coupled to a host digitized image processor (host computer) and attendant video display terminal (VDT) 14. Scanner 12 contains a sensor pixel array capable of generating output signals which, when converted into digital format, yield a 'digitized' color image file from which high a quality color output image may be obtained.

This digitally encoded data file, or 'digitized' color image, is supplied in the form of an imaging pixel array-representative bit map, resolved to a prescribed code width (e.g. eight bits per color per pixel), to host processor 14. Thus, for a three primary color (RGB) digitizing scanner, each pixel of its bit map output is encoded to twenty-four bits. Host processor 14 contains an image encoding and storage operator, through which each digitized color image file is stored, for retrieval of the digitized images for reproduction on a color image output device, such as an RGB color video display 16. A digital-to-analog converter unit 18 is associated with display 16 for driving the respective red, green and blue color guns of the display with analog video signals.

As pointed out previously, the capacity of the frame buffer employed with an output device, such as color display 16, may be typically on the order of eight bits per pixel, a code width which is considerably less than the twenty-four bits per pixel into which an original color image has been digitized by scanner 12. However, since each of three respective digital-to-analog converters of the digital-to-analog converter unit 18 that drives the RGB ports of display 16 has a resolution of eight bits, it is possible for color display 16 to replicate any of the colors within the original digital color image, as long as a code representative of that particular color is stored in the frame buffer. Consequently, it is necessary for host image processor 14 to incorporate a color conversion mechanism through which each color code of the digitized image output of scanner 12 (which may be any color within a total spectrum of $2^{24}=1.6\times10^7$ color codes available to define the original digital color image) is effectively transformed or mapped into one of a lesser number of output colors (e.g. $2^8=256$ colors) for driving output device 16.

In accordance with the present invention, such a color conversion mechanism quantizes a relatively high data precision digital color image, such as the twenty-four bit per pixel digitized color image output by digitizing scanner 12, into a limited number or 'palette' of eight bit color codes that are to be stored within a limited capacity memory of the frame buffer associated with the output device for reproducing the original digital color image. Even though the frame buffer has a considerably reduced storage capacity (eight bits per pixel versus twenty-four bits per pixel output by scanner 12), the palette codes chosen by the image quantizing mechanism in accordance with the invention are those that effectively minimizes the generation of contouring artifacts in the reproduced image and provide an output image having a quality that is pleasing to the human visual system.

As explained supra, the colors of the output color code palette are selected by means of a sequential product code vector quantization mechanism which sequentially partitions the color space of a digital color image, such as a chrominance/luminance histogram of the digital color image into a plurality of luminance-chrominance sub-regions or color space cells, such that each partitioned cell is associated with a color of the output palette through which the color composition of a reproduced color image is defined.

In accordance with an exemplary embodiment of the present invention applied to a luminance, chrominance (Y,Cb,Cr) histogram of the digital color image, at a first step of the partitioning process, the color space luminance, chrominance histogram is subdivided into a plurality of parallel slices along a first of the Cr and Cb chrominance axes, by iteratively performing a binary splitting of that axis, typically at a plurality of locations, the number of which may be predetermined or arrived at adaptively, during the splitting process. Each axial split location of the selected chrominance axis corresponds to the centroid or mean value of the luminance, chrominance histogram population as projected onto that chrominance axis within the segment of the axis being split. At each binary split location along the chrominance axis, the histogram is partitioned by a plane which is perpendicular to that axis and passes through the mean value. The luminance-chrominance slices resulting from this first chrominance axis split effectively represent quantization code values associated with the first chrominance component. Namely, the digital value of the first chrominance component of any pixel of the original digital color image will be quantized to a code value used to identify the slice in which that digital value occurs.

After the histogram has been split into a plurality of slices along the first chrominance axis, each of these slices is split in an iterative manner into a plurality of column or strip-shaped luminance-chrominance regions along the second chrominance axis, by performing a binary splitting of the second axis. Each split location of the second axis corresponds to the centroid or mean value of the histogram population of a respective one of the slices resulting from the previous split as projected onto the second chrominance axis. At each binary split location along the second chrominance axis, a histogram slice is partitioned by a plane which is perpendicular to the second chrominance axis and passes through the mean value of the slice population as projected onto the second chrominance axis. The luminance-chrominance strips resulting from the second chrominance axis split effectively represent quantization code values associated with the second chrominance component. Namely, the digital value of the second chrominance component of any pixel of the original digital color image will be quantized to a code value used to identify the partitioned luminance column in which that digital value occurs.

The luminance-chrominance regions are then sequentially partitioned into a plurality of luminance-chrominance sub-regions by performing a binary splitting of the luminance axis. Each split location along the luminance axis corresponds to the centroid or mean value of the histogram population of a respective one of the luminance-chrominance regions (or a luminance-chrominance sub-region). At each binary split location along the luminance axis, a luminance-chrominance region or subregion is partitioned by a plane which is perpendicular to the luminance axis and passes through the mean value of the histogram population of that region or sub-region as projected onto the luminance axis.

The order in which luminance-chrominance regions or sub-regions are partitioned along the luminance axis is influenced by the spatial activity in the luminance-chrominance regions. After each split of a luminance-chrominance region or sub-region, spatial activity variance values are updated (variance values of the two sub-regions of the most recent split are calculated). The next luminance-chrominance region or sub-region split is then based upon which of the luminance-chrominance regions and any luminance-chrominance sub-regions resulting from the most recent split has the largest weighted splitting criterion. This luminance axis partitioning process is sequentially repeated until the total number of histogram cells (partitioned color space (luminance-chrominance) subregions) corresponds to the desired number of palette colors.

The quantized luminance coordinates of the color space sub-regions resulting from the luminance axis split effectively represent quantization code values associated with the luminance component of the digital color image. Namely, the digital value of the luminance component of any pixel of the original digital color image will be quantized to a code value used to identify the partitioned luminance-chrominance sub-region in which that digital value occurs.

For each of the partitioned histogram sub-regions or color cells, a respective set of luminance and chrominance (Y,Cr, Cb) output codes is derived from the centroid of each color cell. A map of these chrominance and luminance output codes is then generated for the respective pixels of the output color image in accordance with the previously conducted axial splitting or quantization of the chrominance and luminance components of the histogram. The resulting map of chrominance and luminance output codes of the output digital color image is then transformed into sets of RGB output color codes for application to the respective RGB digital-to-analog converters that drive color image reproduction device 16. For this purpose, a video memory in which palette color labels are stored is coupled to a look-up table which generates RGB values associated with the palette color labels. The RGB outputs from the look-up table are applied to respective D-A converters associated with the RGB ports of an image output device.

To facilitate an understanding of the present invention, in the description to follow, the sequence of steps through which the sequential product code vector quantization mechanism is carried out will be described for the case of a reduced spatial complexity digital color image, specifically a sixty-four pixel image comprised of an array of eight rows and eight columns of pixels. The resolution to which each coordinate is encoded will be four bits (rather than the customary eight bits), in order to simplify computation. It should be understood, however, that such a reduced spatial complexity image and data resolution are merely for purposes of example and are not to be considered limitative of images which may be processed in accordance with the present invention. In addition, to simplify the drawings, the image processing sequence will be illustrated in terms of two dimensions of a luminance, chrominance (Y,Cb,CR) color space, specifically with respect to a single chrominance coordinate (Cr) and the luminance coordinate (Y).

In its originally encoded output form a digitized color image (sixty-four pixels in the present example) output by scanner 12 of the system of FIG. 1 is an RGB image, with each respective color (red, green, blue) encoded to eight bits, for a total of twenty-four bits per pixel. Since the human visual system (HVS) attaches different importance to the luminance (Y) and chrominance (C) attributes of a color stimulus, the original digitized color image that has been encoded in terms of RGB coordinates is transformed into a luminance-chrominance (Y,Cr,Cb) space prior to quantization. The luminance-chrominance space employed is preferably related to a gamma-corrected RGB space of the output device 16 by means of a linear transformation customarily employed in color image processing, as described for example in the text by A. Natravali entitled "Digital Pictures," Plenum Press, 1988.

In a practical embodiment of the transform operator, with each of the gamma-corrected R, G and B code values of the original digitized color image being encoded to an eight bit resolution (values 0–255), yielding a total encoding resolution of twenty-four bits per pixel, the color space transformation may be given by:

$Y=0.299R+0.587G+0.114[B$ $Cr=0.627(R-Y)+128$ $Cb=0.496(B-Y)+128,$ where the Y coordinate of the transformed color space is associated with the gamma-corrected luminance component representing achromatic colors, the Cr coordinate is associated with the red-green color variation and the Cb coordinate is associated with the yellow-blue color variation.

Figure 3:
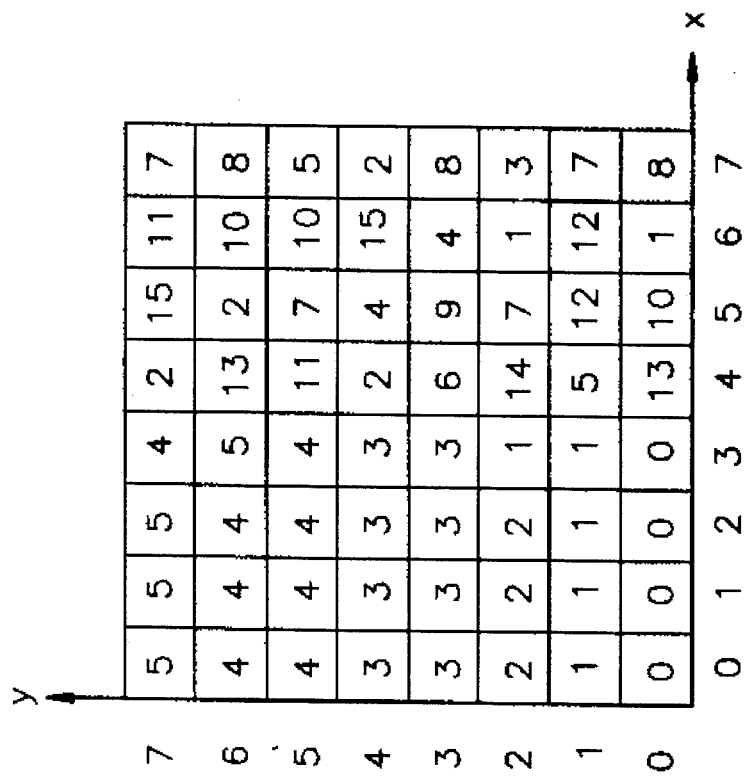
FIG. 3 diagrammatically illustrates an eight-by-eight matrix of encoded luminance Y values of the Y,Cb,Cr-transformed image associated with each of the pixels of the array.
Figure 2:
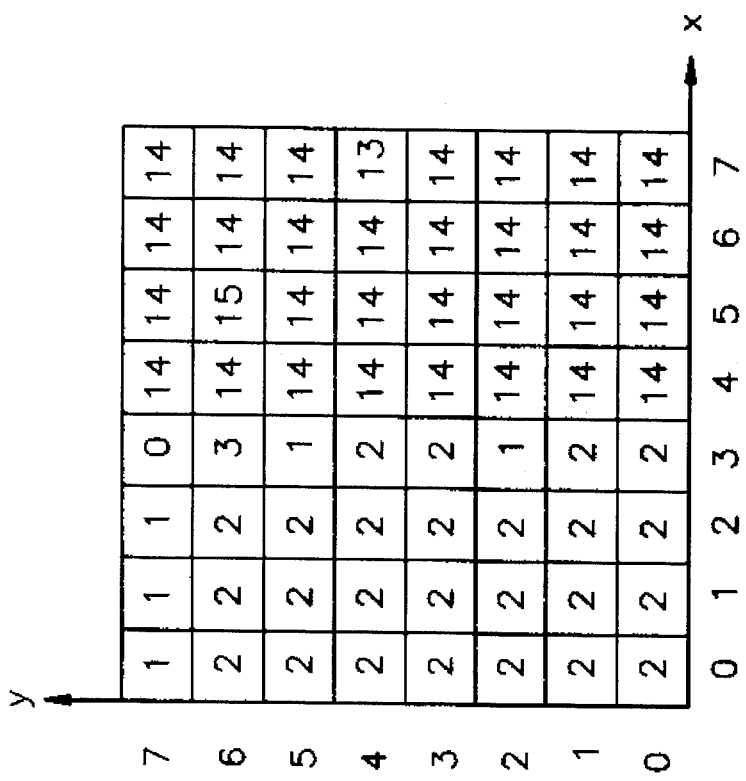
FIG. 2 diagrammatically illustrates an eight-by-eight matrix of encoded chrominance values for the Cr component of an image, whose color coordinates have been transformed from an RGB color space to a Y,Cb,Cr color space, associated with each of the pixels of an eight-by-eight (sixty-four pixels) image array.

FIG. 2 diagrammatically illustrates an eight-by-eight matrix of encoded chrominance values for the Cr component of the RGB-Y,Cb,Cr transformed image associated with each of the pixels of a sixty-four pixel image array. FIG. 3 diagrammatically illustrates an eight-by-eight matrix of encoded luminance Y values of the Y,Cb,Cr-transformed image associated with each of the pixels of the array. A similar eight-by-eight matrix of encoded chrominance values for the Cb component of the RGB-Y,Cb,Cr transformed image associated with each of the pixels of a sixty-four pixel image array is also formed. However, as noted above,in order to simplify the complexity of the drawings, this additional matrix is not shown. Also, in the spatial matrices of Cr and Y values, in order to reduce numerical complexity, each pixel of each eight-by-eight array is resolved to four bits (encompassing sixteen data values 0–15). The x and y axes of FIGS. 2 and 3 are the respective spatial axes of the pixel matrix into which a color image has been digitized. In effect, therefore, the spacial matrices of FIGS. 2 and 3 are respective chrominance (Cr) and luminance (Y) images derived from a transform of the original RGB image into Y,Cr,Cb color space. (As noted previously, a second chrominance (Cb) image matrix (not shown) is also obtained from the RGB-Y,Cb,Cr transformation operation.)

As noted earlier, the sequential product code vector quantization mechanism of the present invention employs spatial activity information to control the order of partitioning of the luminance-chrominance regions, that are obtained by sequential partitioning of a Y,Cb,Cr histogram of the image along the Cb and Cr axes. The use of spatial activity information to refine the composition of the color code palette achieves a key aspect of the present invention—minimizing contouring artifacts. Repeated ('refined') partitioning of those luminance-chrominance sub-regions of the histogram having a relatively low spatial activity will ensure that the color palette includes a sufficient number of variations or shades of a color in a (relatively smooth) region of relatively low spatial frequency, so that a (spatially) large area or region of an image that is essentially the same color, but has HVS-perceptible gradations in tone and shading, will not be reproduced without such gradations, as would be the case if a single given color code were used to reproduce the area of interest, giving rise to a 'cartoon' effect artifact. Conversely, in high spatial frequency, or 'busy' regions of the image, where color detail is less perceptible to the human visual system, the number of components of the palette can be reduced without degrading the quality of the reproduced image.

Figure 4:
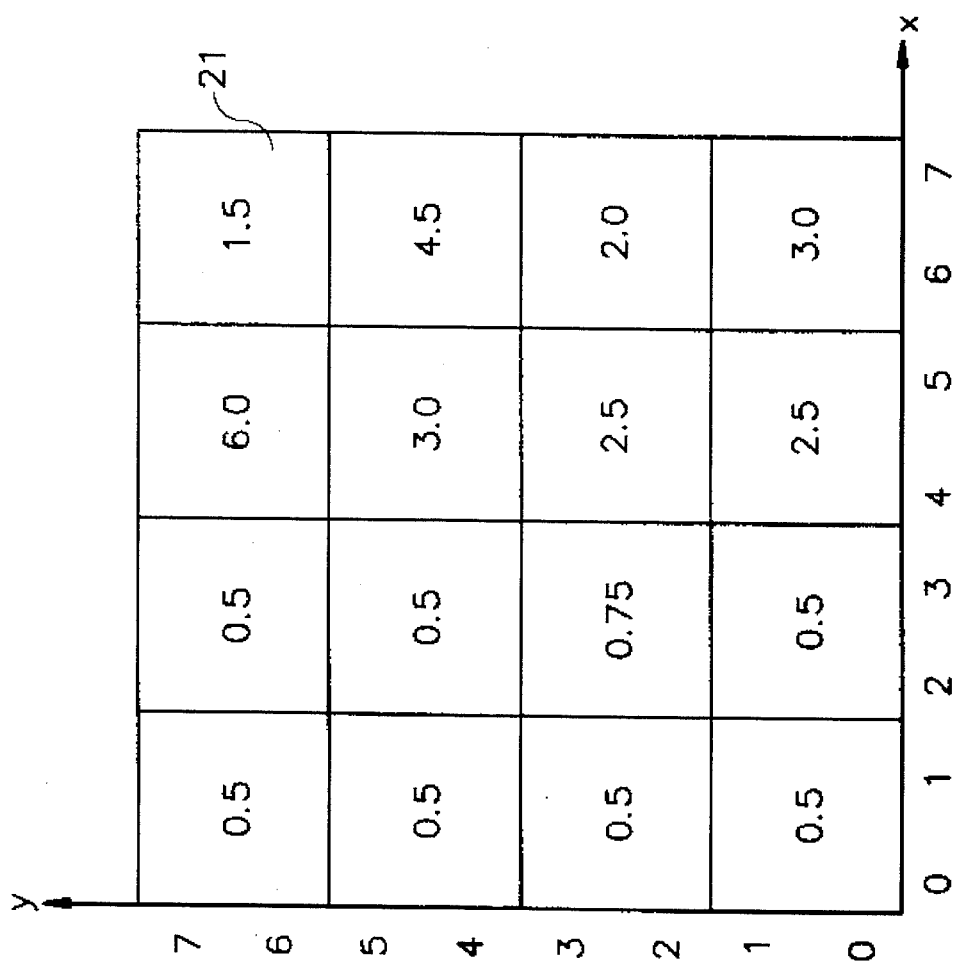
FIG. 4 shows a matrix of luminance variation values derived from the luminance matrix of FIG. 3.

In order to have spatial activity information available during luminance axis partitioning, a matrix of luminance variation values shown in FIG. 4 is derived from the luminance matrix of FIG. 3. Specifically, the luminance variation matrix of FIG. 4 is derived by spatially subdividing the matrix of FIG. 3 into a sub-matrix of regions, identified as matrix regions 21 in FIG. 4, with each region 21 being associated with a plurality (four in the example shown) of mutually adjacent pixels of the luminance image. For each region 21 of FIG. 4, the variation of the luminance values associated with its associated pixels of FIG. 3, is computed. The term variation corresponds to the average of the absolute values of the deviation from the mean of each group of luminance values of FIG. 3 of a respective region 21 of FIG. 4. Thus, for the pixel set (x=4,5; y=6,7) of the luminance image matrix of FIG. 3, the mean luminance value is 8.0. For the four adjacent pixels of the set (x=4,5; y=6,7), whose luminance values are the set (13, 2, 2, 15), the absolute values of the deviations are (5, 6, 6, 7), yielding an average of 6.0, as specified within the corresponding region of FIG. 4.

An examination of FIG. 4 reveals that luminance variation is relatively small (less than 1.0, with seven out of eight regions having a value of 0.5) over the left half of the image array, indicating that the left half of the image is relatively smoothly varying, whereas the right half of the image array, having considerably larger luminance variation values (up to 6.0), is 'busy'. Consequently, the eventually encoded color palette can be expected to contain a relatively larger number of color codes associated with different tonal shades for reproducing the left half of the image without contouring artifacts, and a lesser number of color codes associated with the higher spatial frequencies of the right half of the image.

The basic mechanism used to derive the color code components of the reproduction color palette comprises a histogram of the luminance (Y) and chrominance (Cr, Cb) representative codes of the digitized image. A two-dimensional histogram of the pixel population of the matrices of FIGS. 2 and 3 is shown in FIG. 5, having an abscissa or Cr axis that has been prequantized into in successive pairs of Cr values, and an ordinate or Y axis denoted in successive luminance (Y) values. Not shown in FIG. 5 is a third axis of the overall Y,Cb,Cr histogram, which is perpendicular to the plane of the drawing and is associated with the Cb chrominance component. Like the Cr axis, the histogram distribution along the Cb axis is prequantized in successive pairs of Cb values. In effect, the two-dimensional histogram of FIG. 5 may be considered to represent the Y,Cb,Cr histogram of an image for which all of the pixels have the same Cb value.

A first step in the sequential product code vector quantization mechanism of the present invention is the partitioning of the Y,Cb,Cr histogram along one of its chrominance axes, either the Cr axis or the Cb axis by a prescribed number of planes that are perpendicular to that axis and pass through centroids of the segment of the axis being sliced. Thereafter, the other chrominance axis is partitioned, followed by the partitioning of the luminance axis. For purposes of reducing the complexity of the present description, the participation of the Cb coordinate wall be temporarily ignored. Suffice it to say that at the beginning of the partitioning process, which of the Cr and Cb chrominance axes is partitioned first is determined in accordance with which coordinate has the largest associated reduction in total squared error for an initial split along that axis.

For this purpose, all of the data points of the three-dimensional histogram space are projected upon each of the Cr and Cb axes. For each Cr and Cb axis the centroid CBAR of the projected data points is determined. Each axis is then split at its centroid into first and second axial segments S1 and S2, along which are distributed respective first and second sets n1 and n2 of data points, where n1 and n2 are the numbers of pixels in each group. The two sets of data points n1 and n2, have respective centroids C1BAR and C2BAR. Mathematically, the reduction D in total squared error (TSE) is given by the expression:

$$D_{TSE}=(n1n2/(n1+n2))|C1BAR-C2BAR|^2$$

The value $D_{TSE}$ is determined for each Cr and Cb axis. The axis having the larger value of $D_{TSE}$ is partitioned first. The number of splits along each respective axis will determine the number of regions or 'cells' into which the histogram color space is subdivided, and thereby determines the number of colors of the palette. For a conventional eight bit frame buffer, the total number of available palette codes is 256. From a practical standpoint, for representative sets of color images to which the present invention has been applied, it has been found that each of the chrominance axes Cr and Cb of their associated luminance/chrominance histograms may be split at seven or eight locations, while there may be on the order well over 200 splits of the partitioned chrominance regions into luminance-chrominance sub-regions. This large number of splits along the luminance axis has been found to effectively eliminate objectionable contouring artifacts, thereby resulting in a high quality image that is pleasing to the human visual system.

Again, ignoring for the moment, the Cb axis, it will be assumed that the color palette to be created (the number of cells into which the two dimensional histogram of FIG. 5 is to be partitioned) will contain five output color codes, derived from a single split of the Cr axis into a pair of chrominance regions which, in turn, are partitioned along the luminance axis until the histogram has been subdivided into a total of five color cells. With a single split of the Cr axis into two chrominance regions, three additional splits along the Y axis are required to partition the two chrominance regions into five luminance-chrominance sub-regions. The centroids of these five sub-regions represent the output color codes of the palette.

Each of the chrominance axes (Cr, Cb) of the histogram is prequantized into pairs of chrominance values. This prequantization is to take advantage of the fact that the human visual system is less sensitive to chrominance variations than luminance variations, thus making it possible to reduce computational complexity by prequantizing the chrominance data, dropping the least significant bit. Thus, the chrominance axes of the histogram need be only half as wide (three most significant bits) as the luminance axis, which is full code resolution (four bits=sixteen luminance values) and thereby retains spatial variations in brilliance.

Using the histogram of FIG. 5 and the luminance variation values of FIG. 4, a color activity diagram shown in FIG. 6 is next generated. The color activity diagram of FIG. 6 is obtained by associating each luminance value of the spatial luminance image of FIG. 3 with respective values of the spatial chrominance image of FIG. 2 and assigning to the associated chrominance and luminance values one of the variation values of FIG. 4.

More particularly, for each associated set of luminance and chrominance values derived from FIGS. 2 and 3, there is at least one variation value set forth in FIG. 4. Since the human visual system is more sensitive to low spatial activity values, then, for those 15. coordinate (Cr,Y) pairs of FIG. 6 associated with multiple pixels, whose locations in FIG. 4 fall within different pixel groups and have more than one luminance variation magnitude, the lowest variation magnitude is assigned to that chrominance/luminance pair in building the color activity diagram of FIG. 6. For example, the (Cr,Y) coordinate pair (14,15) occurs twice in FIGS. 2 and 3, but with different spatial variation values of 6.0 and 4.5 listed in FIG. 4 for the two occurrences. The lower variation value of 4.5 is inserted into the corresponding coordinate location (Cr=14,15; Y=15) of the spatial activity diagram of FIG. 6.

An examination of the activity diagram of FIG. 6 reveals where, in terms of the chrominance coordinate Cr, the image will likely require a plurality of output color code values. In the present example the chrominance values at the left side of the histogram of FIG. 5 (for lower Cr values) have relatively low activity values listed in FIG. 6, to which the human visual system is more sensitive, so that their associated color within the image will require an increased number of tonal shades to prevent contouring artifacts.

In the histogram of FIG. 5, the Cr chrominance components of the image of the present example are concentrated in the vicinity of two (extreme) regions of the color space, rather than being spread across the entire color spectrum. This implies that the chrominance components of the color palette will congregate in the vicinity of two regions, one at the lower end of the chrominance axis and one at the upper end of the chrominance axis. (It should be noted that not every image will have its histogram split into only two chrominance regions; typically more regions of concentrated chrominance activity can be expected. The occurrence of two regions at opposite ends of the Cr chrominance axis in the present example is merely for purposes of illustration.)

To quantize the Cr chrominance component in terms of the two chrominance regions of the histogram of FIG. 5, it is necessary to subdivide or split the histogram into chrominance regions along the chrominance axis. As described above, the sequential product code vector quantization mechanism of the present invention sequentially partitions the histogram first along the respective chrominance coordinates and then along the luminance coordinate. In particular, for whichever chrominance axis is partitioned first (based upon its larger reduction in total squared error, described above) a prescribed number of partitioning splits is identified.

As explained above, for representative sets of color images to which the present invention has been applied, it has been found that the chrominance axes Cr and Cb may be subjected to seven or eight binary splits. Thus, if the calculation of the reduction in total squared error selects the Cb axis to be split first, and the Cb axis is then subjected to seven binary splits, the histogram will have been partitioned into eight parallel slices along the Cb axis.

In accordance with the present invention, a splitting criterion L is employed to determine the sequential order of partitioning of the axis. For each of the chrominance axes Cb and Cr the splitting criterion L is equal to the product of the number of data values projected upon the segment of the axis to be split and the variance of the data along that segment of the axis. The segment of the axis having the largest splitting criterion L is split first. After that segment has been split into two sub-segments, respective splitting criteria are then computed for the sub-segments and compared with the splitting criteria for all other segments of the axis. Again, that segment (or sub-segment) of the axis having the largest splitting criterion is split next. This process is repeated until the axis has been partitioned into the number of splits initially assigned to it.

Figure 6A:
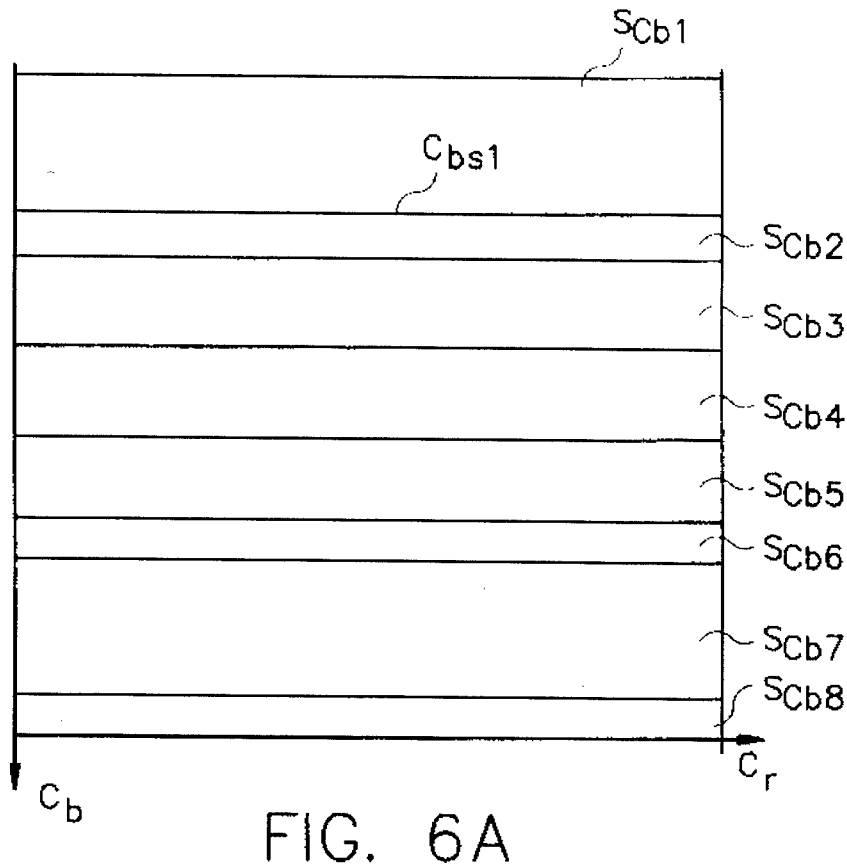
FIG. 6A shows the partitioning of the Cb axis with a projection of seven binary splitting planes on the Cb-Cr plane.

The partitioning of the Cb axis is diagrammatically illustrated in FIG. 6A, which shows the projection of seven binary splitting planes Cb1–Cb7 on the Cb-Cr plane, which are perpendicular to the Cb axis and subdivide the histogram into eight parallel slices SCb1–SCb8. Namely, because the partitioning is a binary operation, the number of partitioned segments or regions is always one more than the number of splits. In the diagram of FIG. 6A, eight slices SCb1–SCb8 result from seven splits Cbs1–CBs7.

With the Cb axis partitioned into eight regions, the Cr axis is split next. For the case of eight splits of the second axis (the Cr axis), it is possible, but not necessarily the case, that each split of the Cr axis will be associated with a respectively different one of the eight parallel slices SCb1–SCb8 of FIG. 6A. Again, where each split occurs will depend upon the above-reference splitting criterion L. Namely, in order to partition the slices of FIG. 6A along the Cr axis, it is necessary to compute a splitting criterion for each of the eight parallel slices SCb1–SCb8. That slice having the largest splitting criterion is split first, at the centroid of the slice. After, this initial split, respective splitting criteria are computed for the two regions into which the slice has been partitioned and compared with the splitting criteria of all other slices. Again, the slice (or sub-slice) having the largest splitting criterion is split next.

Figure 6B:
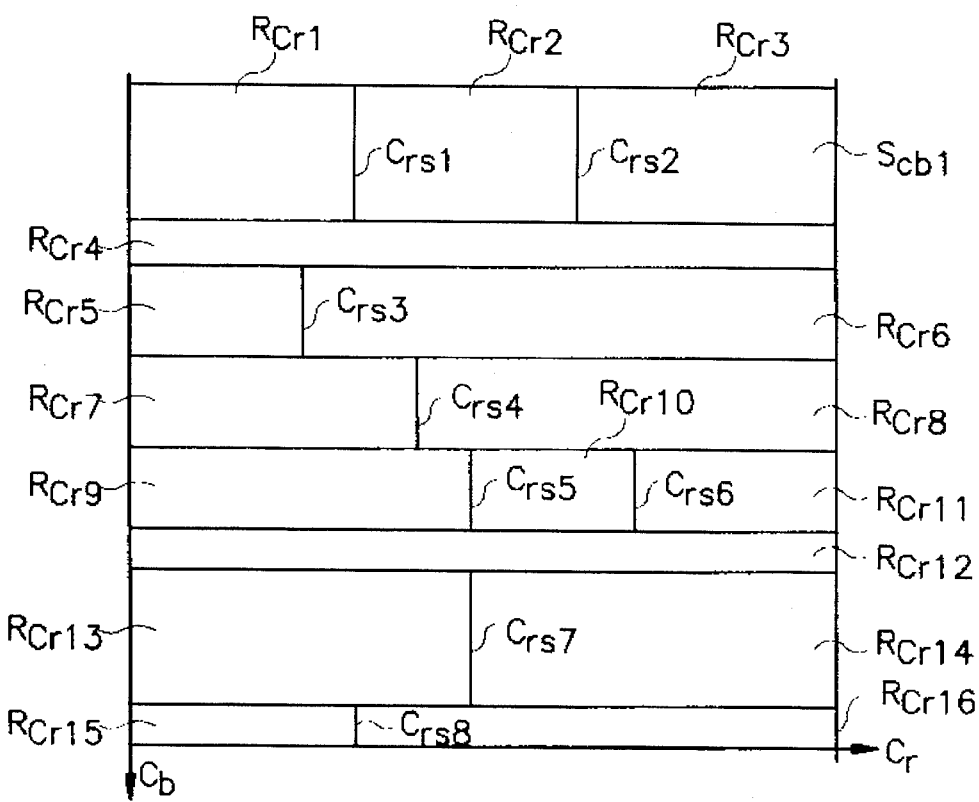
FIG. 6B shows the Cr axis-partitioning of the partitioned color space diagram of FIG. 6A.

As an example, for the eight parallel slices SCb1–SCb8 of the diagram of FIG. 6A, let it be assumed that slice Scb1 has the largest splitting criterion. Then slice Scb1 will be split at its centroid, shown in FIG. 6B as split Crs1, into two sub-slices or regions, one of which is to the left of split Crs1 and one of which is to the right of split Crs1, as viewed in FIG. 6B. After computing the splitting criteria for these two regions, let it be assumed that slice SCb3 has the largest splitting criterion. As a result, slice Scb3 will be split at its centroid, shown in FIG. 6B as split Crs3, into two sub-slices or regions, one of which Rcr5 is to the left of split Crs3 and one of which Rcr6 is to the right of split Crs3. This process of sequential splitting and updating the splitting criteria continues until the partitioned histogram of FIG. 6A has been split along the Cr axis a total of eight splits. FIG. 6B shows an example of how FIG. 6A might be split after eight splits. Note that no splitting of slices Scb2 or Scb6 has occurred, while each of slices Scb1 and Scb5 contains two splits.

The second chrominance axis split (along coordinate axis Cr) thereby subdivides the histogram into twice as many regions in the Cr-Cb plane as the number of splits along the second (Cr) axis to be partitioned. Each of the resulting regions RCr1–RCr16 may be considered a sub-slice or column extending parallel to the Y axis or orthogonal to the plane of FIG. 6B. These sixteen regions or columns RC1–RC16 are then further partitioned by sequential binary splitting along planes orthogonal to the Y axis, until the color space has been subdivided into a total of 256 luminance-chrominance sub-regions or color cells.

Splitting the histogram into eight quantized segments or slices SCb1–SCb8 along the first (Cb) axis yields a code width of three bits. Subdividing the eight slices of the first axial split into sixteen quantization sub-regions RCr1–RCr16 requires a total code width of four bits, or one additional bit. The remaining available slices of the regions RCr1–RCr16 of FIG. 6B into 240 luminance sub-regions requires a total of eight bits, or four bits in addition to the four bits associated with the Cb and Cr axial partitioning. By constructing a set of look-up tables, as diagrammatically illustrated in FIG. 6C, each of which is associated with a respective one of the quantization/partitioning of a respective axis of the histogram a very rapid mapping of the luminance and chrominance values of the original digital color image into output code values of a transform color palette may be accomplished. The manner in which such a set of look up tables is obtained in accordance with the sequential product code quantization mechanism of the present invention will now be described.

As described earlier, in the present example, the color palette to be created is to contain five output color codes. For the histogram of FIG. 5, there will be a single split along the chrominance axis which will create two chrominance regions. These two chrominance regions will then be further partitioned along the luminance axis until a total of five luminance-chrominance sub-regions are realized. The centroids of these five sub-regions represent the output color codes of the palette.

Figures 6C, 7:
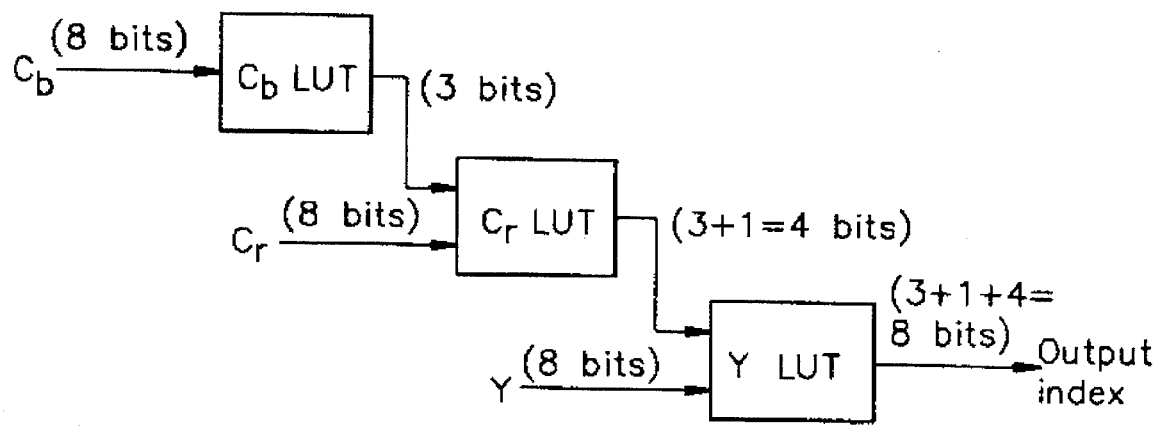
FIG. 6C shows a set of look-up tables, each of which is associated with a respective one of the quantization/partitioning of a respective axis of a Y,Cb,Cr histogram.
FIG. 7 is a marginal Cr histogram derived from the histogram of FIG. 5.

In order to determine where, along the chrominance axis, the histogram should be split, a simplified or 'compacted' version of the histogram of FIG. 4 may be created by projecting onto the Cr axis the sums of the histogram values along the Y axis, thereby producing a 'marginal Cr histogram' shown in FIG. 7. In accordance with the sequential product code quantization mechanism of the present invention, the chrominance axis is partitioned by a prescribed number of sequential binary splits beginning with the centroid or mean of the marginal Cr histogram, and proceeding through the centroids of the split regions or segments into which the marginal histogram has been partitioned by the split, and so on, until the Cr axis has been partitioned into a plurality of chrominance regions the number of which is one more than the prescribed number of splits.

For a single split along the Cr chrominance axis, then a chrominance region partitioning point Crp is that which passes through the mean of the marginal Cr histogram of FIG. 7. For the data of the present example, partitioning point Crp falls at a Cr value of 8.5. Partitioning the histogram of FIG. 5 into respective chrominance regions at this Cr value (Cr=8.5) produces a chrominance-partitioned histogram shown in FIG. 8, containing chrominance regions Cr1 and Cr2.

Figure 9:
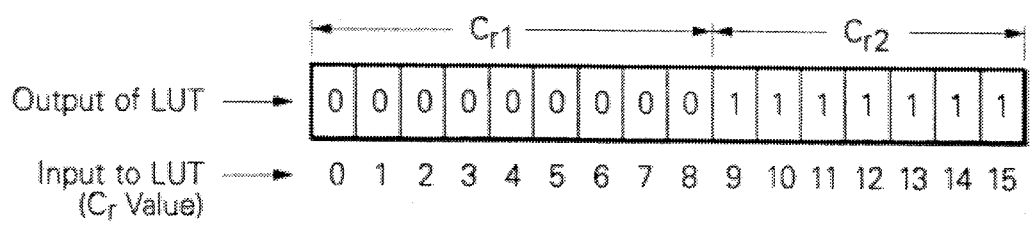
FIG. 9 is a quantized Cr chrominance value look up table.

Since any color value within the color palette must fall into one of these two chrominance regions (Cr1 or Cr2), only a single bit is required to quantize the chrominance component. For this purpose, a chrominance region map or look up table (LUT) shown in FIG. 9 is derived. This chrominance LUT effectively corresponds to the chrominance look up table CrLUT in FIG. 6C, referenced previously, and is defined by quantizing the original four bits resolution of the Cr chrominance data (covering chrominance values 0–15) into a single bit (0 or 1). Namely, for the above-referenced chrominance axis split value of 8.5, all chrominance values of the digitized image having a magnitude less than 9.0 are quantized to a chrominance bit value of '0' while all chrominance values of the digitized image having a magnitude of 9.0 or greater are quantized to a chrominance bit value of '1'.

In accordance with sequential product code technique of the present invention, the splitting criterion employed to determine the order of partitioning of the palette color space along the luminance axis of the histogram is 'weighted' in accordance with the associated distribution of the color activity, set forth in FIG. 6. Specifically, luminance-chrominance region partitioning is governed by which of the regions produces the largest 'weighted' splitting criterion, based upon spatial activities within the regions.

More particularly, as explained above, the normal splitting criterion L is equal to the product of the number of data values projected upon the segment of the axis to be split and the variance of the data along that segment of the axis. The segment of the axis having the largest splitting criterion L is split first. After that segment has been split into two sub-segments, respective splitting criteria are then computed for the sub-segments and compared with the splitting criteria for all other segments of the axis. Again, that segment (or subsegment) of the axis having the largest splitting criterion is split next. This process is repeated until the axis has been partitioned into the number of splits initially assigned to it. When splitting along the luminance axis, however, the sensitivity of the human visual system to contouring artifacts in an image region with low spatial activity is taken into account in order to minimize contouring artifacts.

The present invention operates to avoid contouring artifacts in the image reproduced from the color palette by including within the color code capacity of the palette a sufficient number of variations or shades of a color for an image region of relatively low spatial frequency. As a result, a (spatially) large region of an image that is essentially the same color but has HVS-perceptible gradations in tone and shading will not be reproduced without such gradations, as would be the case if a single given color code were used to reproduce the area of interest, giving rise to the previously mentioned 'cartoon' effect. Conversely, in high spatial frequency regions of the image, where color detail is less noticeable to the human visual system, the number of color codes can be reduced without degrading the quality of the reproduced image.

In order to determine where, along the luminance axis of the histogram, luminance-based partitioning should occur, the color activity diagram of FIG. 6 is used to generate weighting values wr for scaling the splitting criteria L of each of the regions of interest to modified splitting criteria L'. The weighting value wr of each region is calculated to be equal to the reciprocal of the average activity of the region. The average activity is computed to be the averaged sum of the products of the number of data values for each respective luminance value within the region and the activity value for that luminance value as listed in FIG. 6. The averaging is taken over the total number of data values within the region for which the splitting criterion is to be calculated.

Thus, a region of lower spatial activity will have a higher weighting value, which is intended to emphasize a region of lower spatial activity, where contouring artifacts are a potential problem. In the histogram of the present example, because of its very substantial spread, the weighted luminance activity of chrominance region Cr2 is larger than that of chrominance region Cr1, so that splitting along the luminance axis will take place first within chrominance region Cr2. The partitioning of chrominance region Cr2 along the Y axis of the histogram is determined by computing the Y axis mean of the histogram data within chrominance region Cr2, tabulated in a conditional luminance histogram YCr2 shown in FIG. 8 adjacent to chrominance region Cr2. The term 'conditional' is used to describe a marginal histogram the color space coverage of which is conditional upon a previous partitioning of the color space. Thus, in FIG. 8, since the contents of each of chrominance regions Cr1 and Cr2 is conditional upon the manner in which the chrominance axis Cr has been partitioned, marginal histograms YCr1 and Ycr2 respectively associated with regions Cr1 and Cr2 are termed conditional histograms.

In the present example, the mean of the conditional luminance histogram YCr2 is calculated between a value of 8.0 and 9.0 and therefore is located at a Y value of 9.0. Thus, for the first split along the Y axis of the histogram, the sequential product code splitting criterion causes chrominance region Cr2 to be partitioned into a luminance-chrominance sub-region YCr2-1 encompassing luminance values 0–8 and a luminance-chrominance sub-region YCr2-2 encompassing luminance values 9–15, as diagrammatically shown in FIG. 10.

After partitioning chrominance region Cr2, respective weighted splitting criteria L' are generated for each of luminance-chrominance sub-regions YCr2-1 and YCr2-2 and are compared with the (previously calculated) weighted splitting criterion L' for chrominance region Cr1 (which has not yet been partitioned along the Y axis), in order to determine which region is to be partitioned next. The updating of the weighted splitting criteria reveals that, with chrominance region Cr2 having been partitioned into luminance-chrominance sub-regions YCr2-1 and YCr2-2 because of its very substantial spread, the weighted splitting criteria L' of each of luminance-chrominance sub-regions YCr2-1 and YCr2-1 are calculated to be smaller than that of chrominance region Cr1, so that chrominance region Cr1 is partitioned next.

Figure 10:
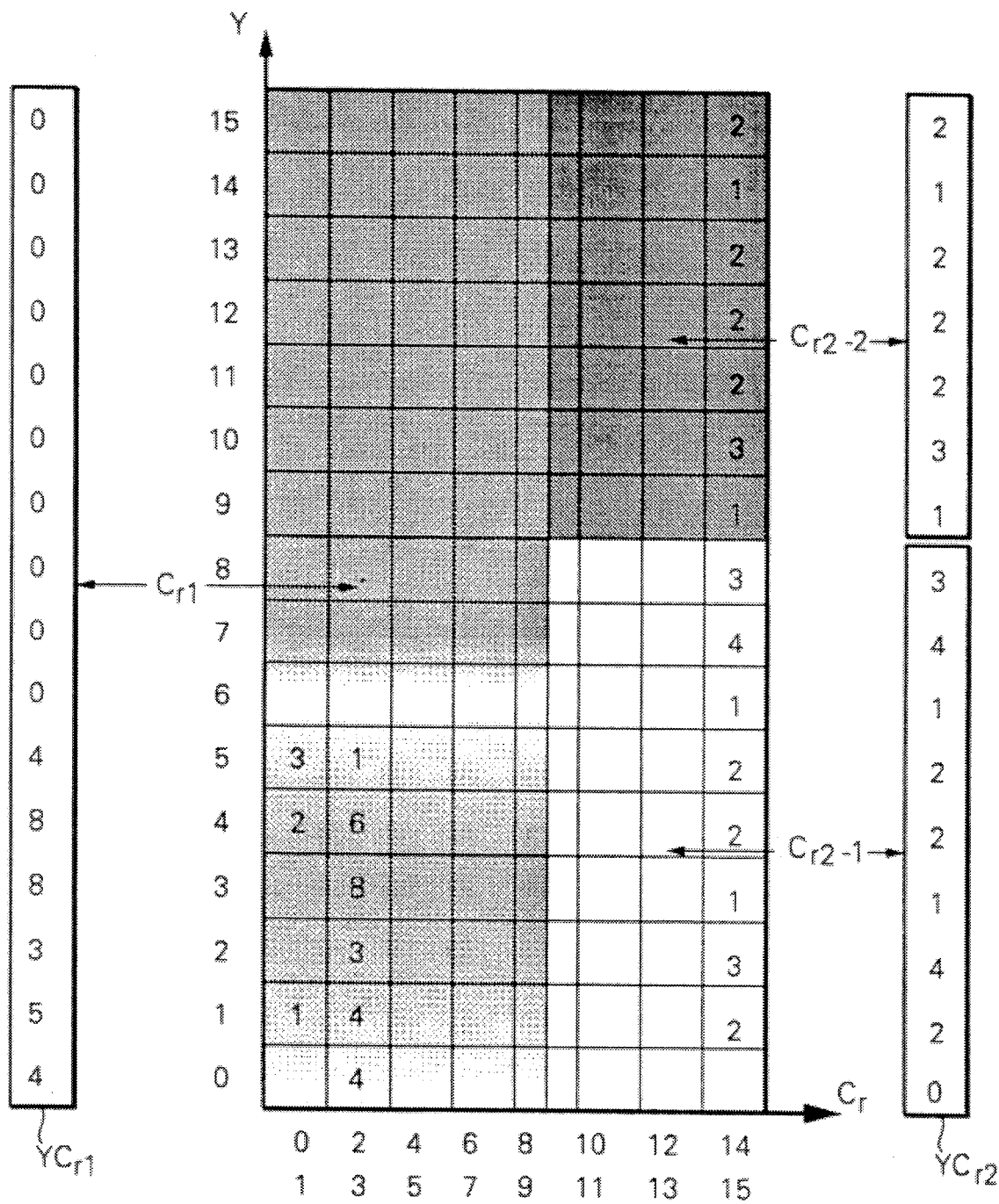
FIGS. 10, 11 and 12 are respective illustrations showing luminance partitioning of the chrominance-partitioned histogram of FIG. 8.
Figure 11:
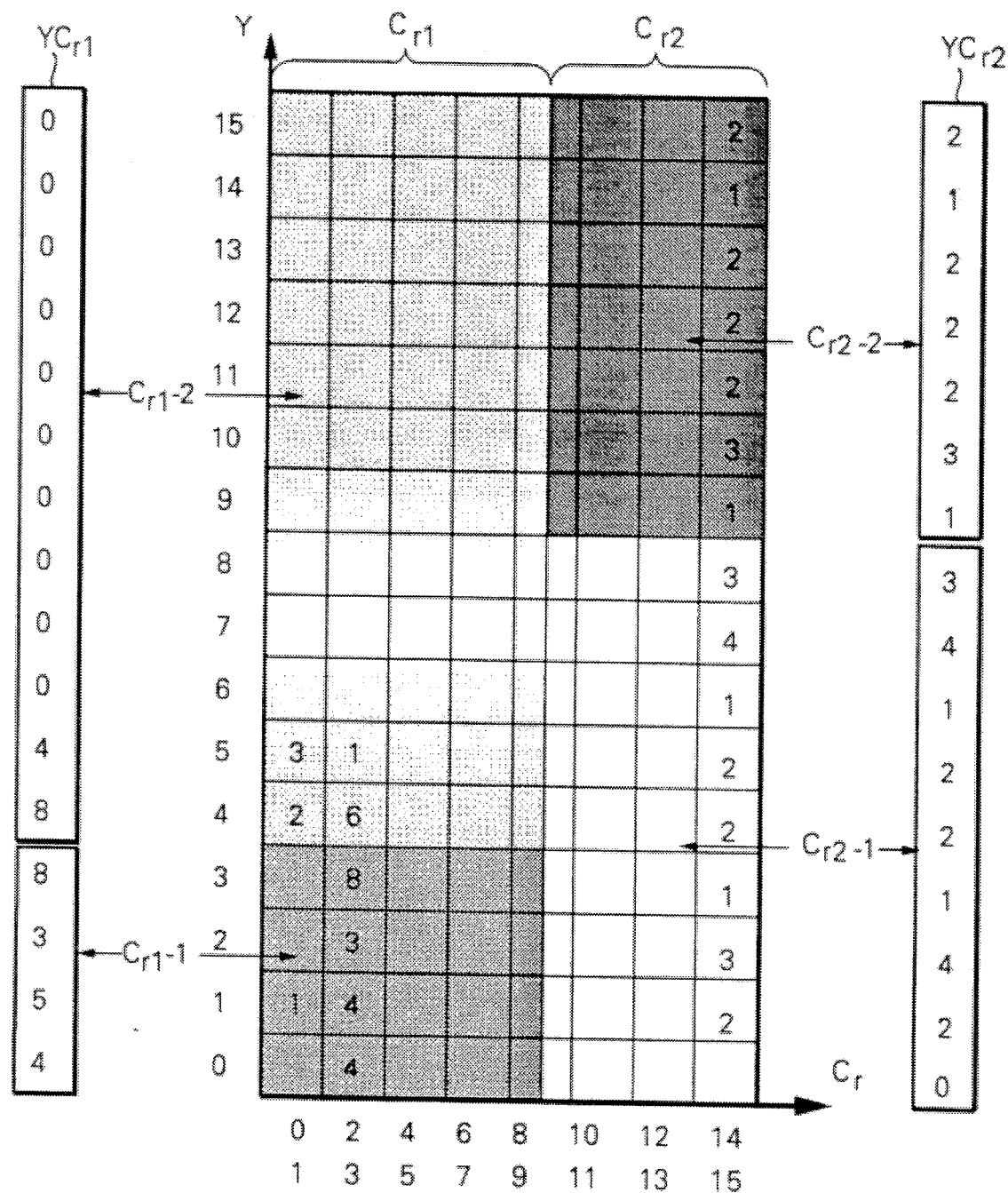

As described above, the partitioning of a chrominance region along the Y axis of the histogram is determined by computing the Y axis centroid of the histogram data within that region, here using the marginal luminance histogram YCr1 shown in FIG. 10 adjacent to chrominance region Cr1. In the present example, the mean of the marginal luminance histogram YCr1 is calculated to occur between a value of 3.0 and 4.0, which causes chrominance region Cr1 to be partitioned into a luminance-chrominance sub-region YCr1-1 encompassing luminance values 0–3 and a luminance-chrominance sub-region YCr1-2 encompassing luminance values 4–15, as shown in FIG. 11. At this point in the sequential product code vector quantization process, the histogram has been partitioned into four of the five cells that will make up the color code palette.

To determine the Y axis location of the final luminance split (the fourth in the present example, to realize five palette color cells within the histogram), respective weighted splitting criteria are generated for each of luminance-chrominance sub-regions YCr1-1 and YCr1-2 and compared with the (previously calculated) weighted splitting criteria for each of luminance-chrominance sub-regions YCr2-1 and YCr2-2. The weighted splitting criterion of luminance-chrominance sub-region YCr1-1 is the largest of the four, so that luminance-chrominance sub-region YCr1-1 is partitioned into a pair of sub-regions YCr1-1a and YCr1-1b, shown in FIG. 12 as encompassing luminance values 0–2 for sub-region YCr1-1a and luminance value 3 for luminance-chrominance subregion YCr1-1b. The sequential product code partitioning of the histogram into the five requisite cells is now complete and is represented by the partitioning of the marginal luminance histograms YCr1 and YCr2 of FIG. 12.

Figure 12:
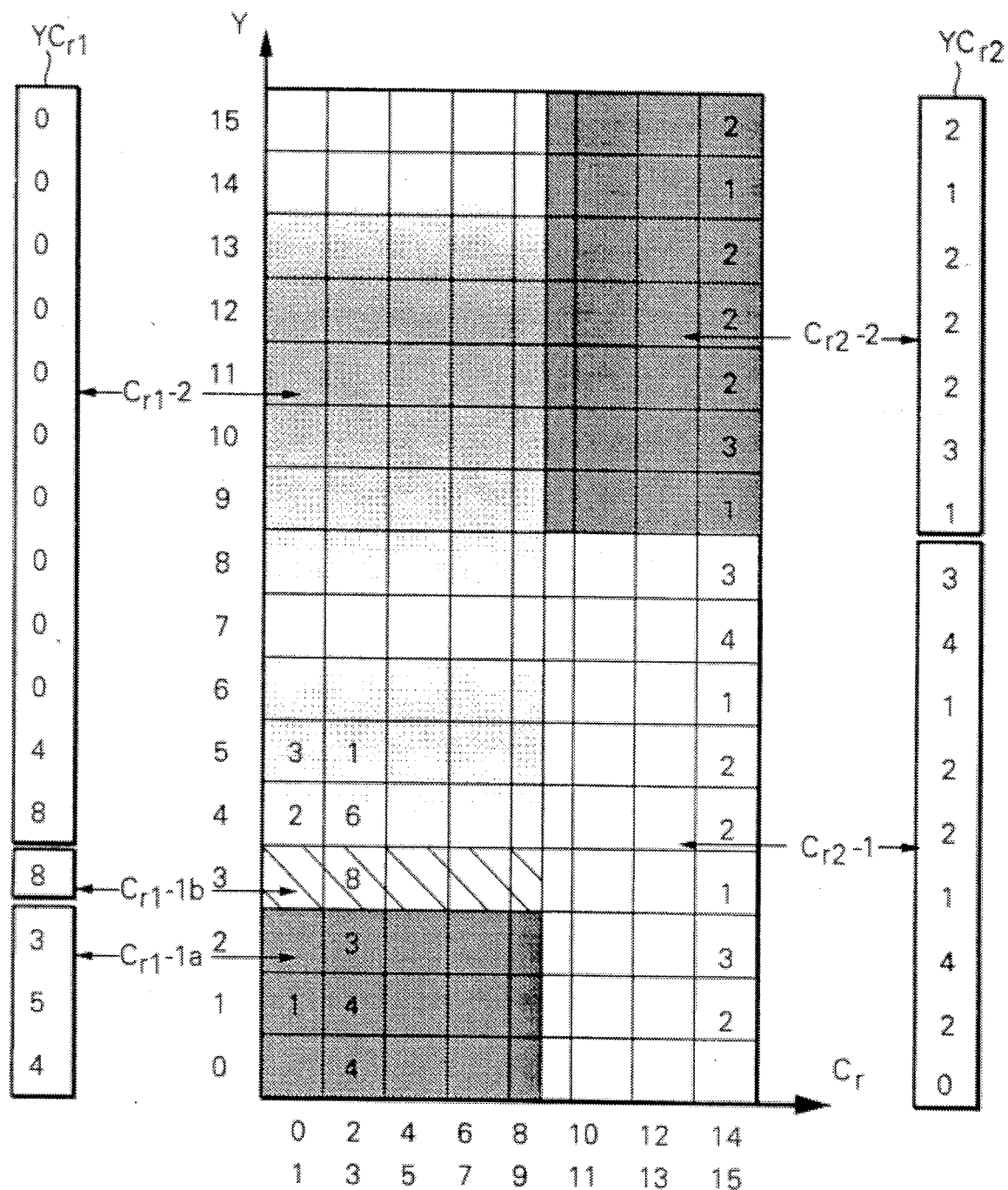
Figures 13, 14:
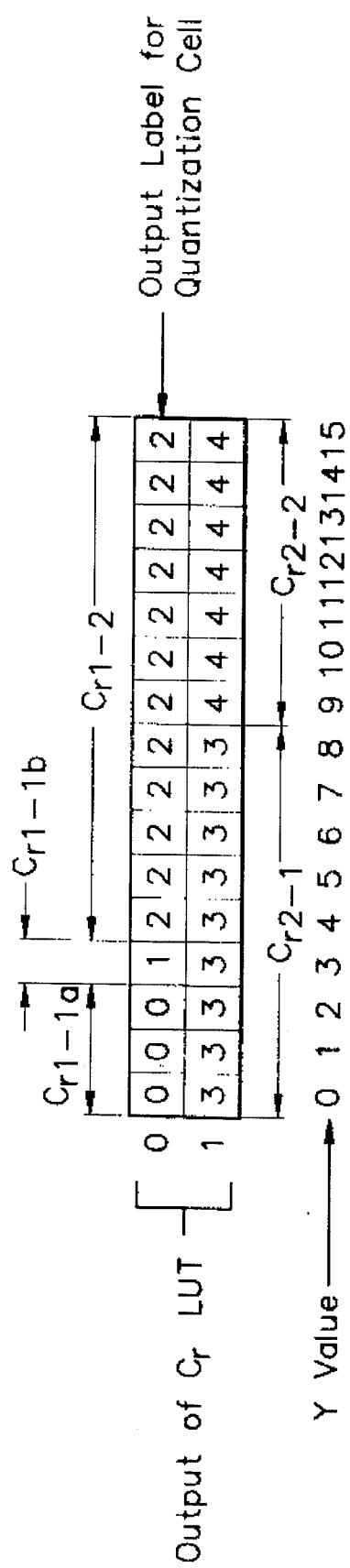
FIG. 13 shows a quantized luminance-chrominance subregion look-up table.
FIG. 14 is a palette color map tabulating calculated centroid values.

The partitioned marginal luminance histograms YCr1 and YCr2 of FIG. 12 are next combined into a luminance look-up table illustrated in FIG. 13, with numerical code values 0–4 used to identify with which of respective partitioned luminance-chrominance sub-regions YCr1-1a, YCr1-1b, YCr1-2, YCr2-1 and YCr2-2, matrix locations of the histogram are associated. Namely, the look-up table of FIG. 13 has a one-bit chrominance code to identify one of the chrominance regions Cr1 and Cr2, as denoted by the chrominance region map or look up table shown in FIG. 9 and corresponding to look-up table CrLUT in the cascaded configuration of FIG. 6C.

As described previously, in the chrominance region LUT of FIG. 9, all chrominance values of the digitized image within chrominance region Cr1 are quantized to a chrominance bit value of '0' while all chrominance values of the digitized image within chrominance region Cr2 are quantized to a chrominance bit value of '1'. Chrominance bit value '0' is associated with marginal luminance histogram YCr1, and chrominance bit value '1' is associated with marginal luminance histogram YCr2. Thus, FIG. 13 effectively associates a chrominance bit value and a luminance bit value with one of the numerical code values 0–4 that identifies one of the partitioned luminance-chrominance sub-regions YCr1-1a, YCr1-1b, YCr1-2, YCr2-1 and YCr2-2, each of which represents one of the five palette colors.

The actual chrominance and luminance values used to define each color code of the palette are the Cr and Y coordinates of the centroids of the respective luminance-chrominance sub-regions of the partitioned histogram of FIG. 12. These calculated centroid values are tabulated in the palette color map shown FIG. 14, which lists each luminance-chrominance sub-region, its associated numerical value employed in the Y look-up table of FIG. 13 and the calculated Cr and Y coordinates of the centroids of each sub-region.

Figures 15, 16:
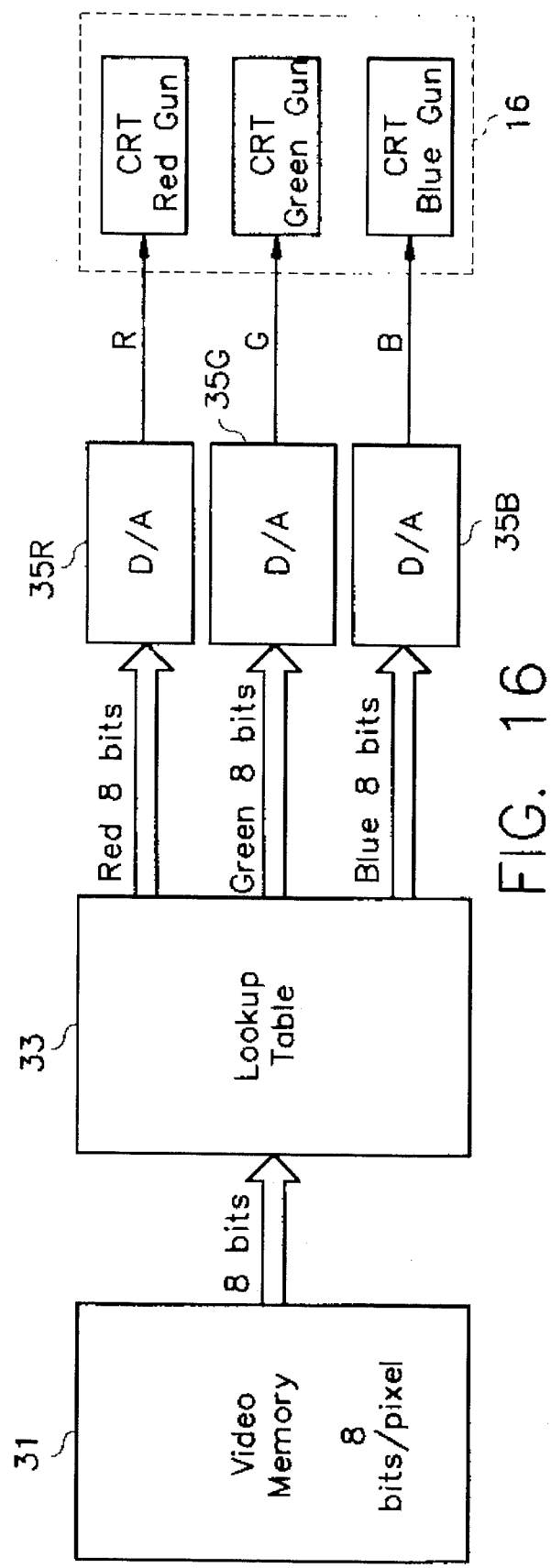
FIG. 15 spatially associates each of the pixels of the image array of FIGS. 2 and 3 with one of the numerical values of the respective luminance-chrominance sub-regions of the partitioned histogram of FIG. 13, and tabulated in the look-up table of FIG. 13.
FIG. 16 diagrammatically illustrates the connection of a video memory in which the color codes of the palette are mapped to their respective twenty-four bit color values by way of a look-up table which drives respective D-A converters associated with the RGB ports of an image output device.

In order to map the palette values tabulated in the map of FIG. 14 into the image array, an output image map shown in FIG. 15 is created. Specifically, FIG. 15 spatially associates each of the pixels of the image array with one of the numerical values (0–4) of the respective luminance-chrominance sub-regions of the histogram, and tabulated in the look-up table of FIG. 13. To create the map of FIG. 15, for a pair of x,y coordinates of a respective pixel of each of the chrominance and luminance image arrays of FIGS. 2 and 3, a chrominance Cr value and a luminance value Y of the original digital color image are obtained. For example, for the x,y coordinate pair (x=5, y=6), the original image (FIGS. 2 and 3) has a chrominance value of Cr=15 and a luminance value of Y=2. From the Cr LUT of FIG. 9, an input Cr value of Cr=15 is quantized to a value of '1'. From the Y LUT of FIG. 13, the quantized Cr value of '1' and the luminance value of '2' produce the luminance-luminance sub-region numerical identifier '3'. Thus, the palette code identifier '3' is loaded into the output image matrix coordinate location (x=5, y=6) of FIG. 15.

As pointed out previously, although the foregoing example of the sequential product code vector quantization mechanism of the present invention has been described and illustrated for a two-dimensional Y-Cr color space, it is actually carried out for a three-dimensional color space, taking into account the Cb coordinate of the Y,Cr,Cb coordinate system, so that the respective histograms and associated conversion tables of FIGS. 5–12 are actually associated with a three-dimensional color space. Thus, as demonstrated by the cascaded look-up tables of FIG. 6C, the resulting output code map of FIG. 14 for the complete three-dimensional color space will also include a listing of output Cb values, in addition to the Y and Cr values currently listed.

After the quantization of the Y,Cr,Cb color space, the luminance (Y) and chrominance (Cr, Cb) codes are reconverted back into respective R, G and B code values. For this purpose, as shown in FIG. 16, a video memory 31 in Which palette color labels are stored may be coupled to a look-up table 33, which generates RGB values associated with the palette color labels. The RGB outputs of look-up table 33 are applied to respective D-A converters 35R, 35G and 35B associated with the RGB ports of the image output device 16.

Because the processing of three dimensional data, particularly the storing of a three dimensional histogram in an associated three dimensional memory array, may require an extremely large amount of memory (e.g. even with the prequantization of the two chrominance components a 256×128×128 (four megabytes) array), alternative processing of the histogram is desirable. This is particularly true where the histogram contains a large number of 'no data' entries, as illustrated in the example of FIG. 5 for chrominance values Cr=(4–13), and over the range of luminance values (Y=6–15) for chrominance values (Cr=0–3). Also, for chrominance value (Cr=12–13), the histogram contains a luminance value entry only at (Y=2).

Figure 8:
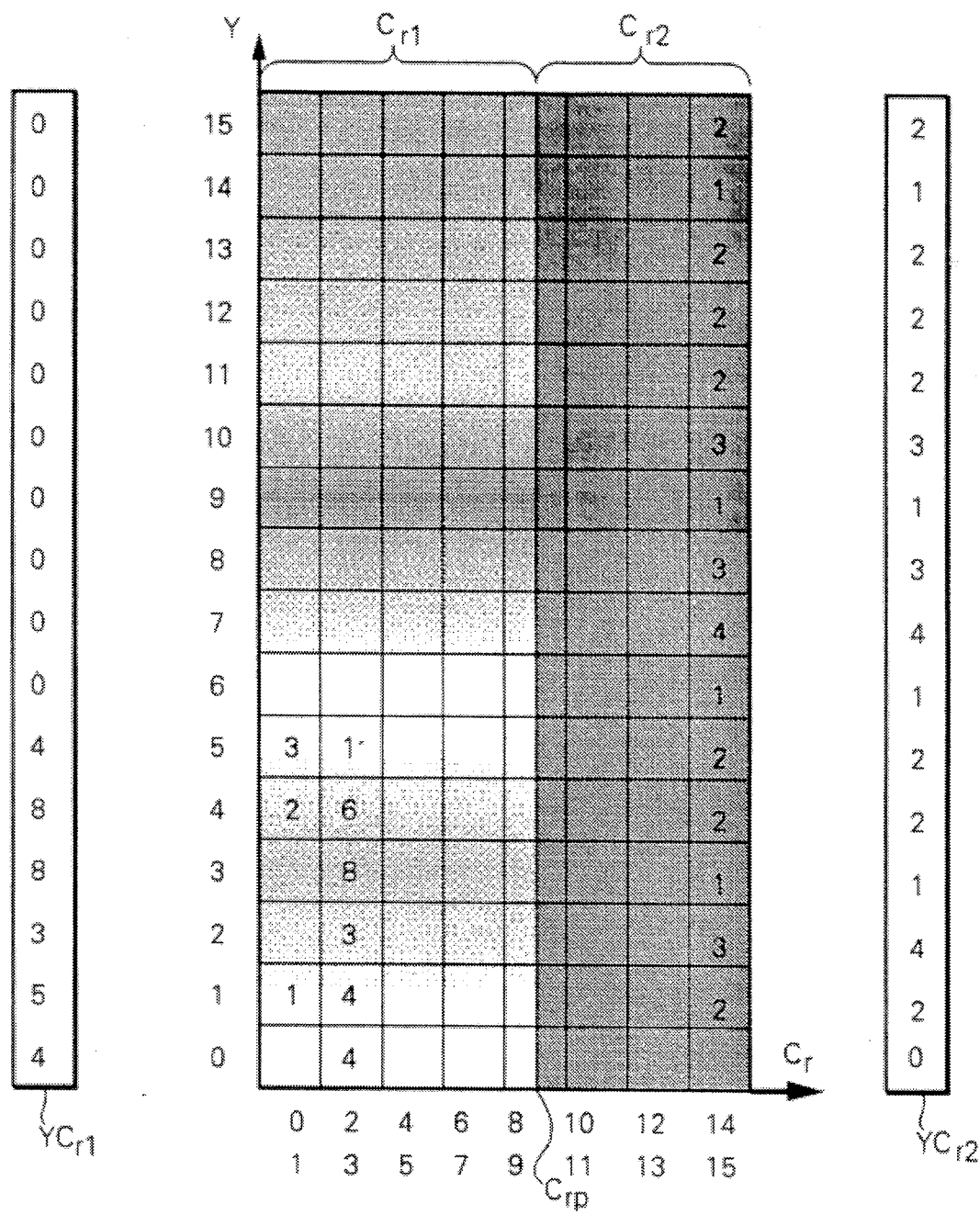
FIG. 8 shows the manner in which the histogram of FIG. 5 is split into a chrominance-partitioned histogram having respective chrominance regions Cr1 and Cr2.

In accordance with alternative histogram processing, rather than provide memory for the entire three dimensional range of the histogram, the amount of memory employed is histogram entry-dependent. Pursuant to a first alternative, histogram entries are generated sequentially in association with quantization processing along each respective coordinate axis. In particular, only marginal and conditional histograms, such as the marginal Cr histogram illustrated in FIG. 7, and the conditional luminance histograms YCr1 and YCr2 shown in FIGS. 8, 10 and 11 are generated. Thus, for the first chrominance axis to be quantized, only a single one-dimensional marginal histogram (which comprises a summation of all data entries projected upon the respective axis), is generated. In the simplified two-dimensional example described above in which the Cb chrominance axis has not been illustrated, quantization of the first axis processed (the Cr axis) requires only a one-dimensional marginal histogram (FIG. 7).

The sequential processing of the next coordinate also employs one dimensional histogram storage. For the second axis processed, however, a plurality of one-dimensional histograms are required. Specifically, the number of conditional histograms required for any coordinate axis will depend upon the number of conditional histograms employed to quantize the previous axis and the number of splits of that axis. Thus, as described previously, in the illustrated two-dimensional example, in addition to the single marginal histogram for the Cr coordinate, a pair of conditional histograms are generated for the luminance coordinate in association with the two quantized regions YCr1 and YCr2 into which the Cr coordinate has been partitioned based upon the processing of its one dimensional histogram.

This sequential one-dimensional histogram processing is attractive, not only because less memory is required, but less computation is needed to generate a one-dimensional histogram than to build a three-dimensional histogram. Moreover, because the one-dimensional approach looks at data only along one axis, the maximum size of a data set is the range of the coordinate, not the product of all three coordinates. Thus, for a digital image encoded to eight bits per color per pixel, the maximum size of the data set is 256 entries, rather than 256×256×256. There is a trade-off with speed however, using the one-dimensional histogram processing approach, particularly in the course of quantizing along the luminance axis, since multiple (three) passes through the image are required. Still, this scheme offers a significant reduction in memory requirements.

Another data entry-dependent method to reduce histogram memory involves the generation of a two-dimensional array to represent the three-dimensional histogram. For this purpose, the three-dimensional color space is stored in terms of two coordinates, e.g. the Cr and Cb chrominance coordinates. Each entry of the array is a look-up table of color data covering the range of the luminance values for a respective chrominance coordinate location. In effect, this array is a compressed version of the three-dimensional histogram, the degree of compression depending upon the number of Color space coordinates having no data entries. An entry value of a third coordinate, such as luminance, may be stored as a binary tree structure. When accessing the two-dimensional array a corresponding value of a third coordinate data entry is located by conducting a binary search along the third coordinate (luminance axis) of the two-dimensional array.

A significant processing advantage of the present invention is the manner in which the above described quantization look-up tables are effectively cascaded with one another, as shown in FIG. 6C, which allows the image data to be read in, pixel by pixel, and thus obviates the need to store the entire image in memory. Moreover, since it is unnecessary to store the entire image in memory in order to perform instantaneous mapping at the output of the process, it is not necessary to use the entire image in order to configure the output color code palette.

In addition, the present invention may also be used with subsampled images. The image may be subsampled either vertically (along the y axis), horizontally (along the x axis), or both. Moreover, the samples may be nonuniformly spaced. In the case of subsampling the image by a factor m in each spatial direction (x and y), then the number of pixels being processed is reduced by a factor of $m^2$; consequently, processing time can be reduced. The effect of subsampling in the course of sequential splitting will depend upon the extent to which the subsampling of the image reduces the number of distinct colors. Still, a significant reduction in processing time is afforded with only a minimal reduction in image quality.

As will be appreciated from the foregoing description, the sequential product code vector quantization technique of the present invention effectively serves as a digital image data compression mechanism that is capable of successfully quantizing chrominance and luminance features of an image based upon a conditional distribution of these features within partitioned regions of chrominance/luminance color space. The sequential product code scheme provides a set of coordinate conversion look-up tables which, when cascaded together, provide a transform operator for rapidly converting the color value of each pixel of an original image into an output image color code that both closely matches the color of the original image and is spatial activity dependent, so as to prevent the generation of contouring artifacts in the reproduced image.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of converting a first digital color image, having a color composition encoded into first luminance representative codes and first chrominance representative codes of a first encoded color resolution, to a second digital color image having a color composition encoded at a second encoded color resolution different from said first encoded color resolution and color codes of which are selected to reproduce a color image having a quality that is pleasing to a human visual system, said method comprising the steps of:

(a) subdividing said first digital color image into a plurality of spatially adjacent groups of pixels;

(b) for each group of the pixels subdivided in step (a), deriving luminance activity values from the first luminance representative codes associated therewith;

(c) generating a color space histogram of said first luminance representative codes and said first chrominance representative codes;

(d) associating the luminance activity values derived in step (b) with the color space histogram generated in step (c);

(e) partitioning said color space histogram, along an axis associated with a chrominance component of said first digital color image, into histogram chrominance regions, based upon a chrominance composition of said color space histogram;

(f) partitioning said color space histogram chrominance regions, along an axis associated with a luminance component of said first digital color image, into histogram luminance-chrominance regions, based upon a distribution of the luminance activity values within said color spaced histogram chrominance regions;

(g) or each of said color space histogram chrominance and luminance regions, deriving a respective set of chrominance and luminance output codes based upon a distribution of the chrominance composition and luminance activity within said color space histogram chrominance and luminance regions, respectively; and (h) defining the second color composition of a respective pixel of said second digital color image in accordance with one of the respective sets of chrominance and luminance output codes derived in step (g).

2. A method according to claim 1, wherein step (h) comprises generating a map of chrominance and luminance output codes for the respective pixels of said second digital color image in accordance with a quantization of the chrominance component of said first digital color image into chrominance values associated with said color space histogram chrominance regions.

3. A method according to claim 2, wherein step (h) comprises generating said map of chrominance and luminance output codes in accordance with the luminance representative codes through which the color composition of each of the pixels of said first digital color image is encoded.

4. A method according to claim 1, further comprising the step of (i) transforming said map of chrominance and luminance output codes of said second digital color image into sets of output color codes for application to a color image reproduction device through which a color output image is provided.

5. A method of quantizing a color composition of a digital color image, comprising the steps of:

(a) generating a color space histogram of the color composition of pixels of said digital color image in terms of prescribed color coordinates through which the color composition of said digital image is definable;

(b) performing sequential product code partitioning of said color space histogram along respective chrominance and luminance coordinate axes thereof, so as to subdivide said color space histogram into a plurality of color space regions each comprising respective color space contents; and (c) for each of the color space regions into which said color space histogram has been subdivided in step (b), deriving a respective output code representative of the respective color space contents of the plurality of color space regions.

6. A method according to claim 5, further including the step of (d) associating respective ones of the output codes derived in step (c) with pixels of an output image, which correspond spatially to the pixels of said digital color image.

7. A method according to claim 6, further including the step of (e) transforming the respective codes of said output image into output color codes for application to a color image reproduction device through which a color output image is provided.

8. A method according to claim 5, wherein at least one of the prescribed color coordinates of the color space histogram generated in step (a) is prequantized to a digital resolution less than the digital resolution to which said at least one of the prescribed color coordinates of said digital color image is encoded.

9. A method according to claim 8, wherein the prescribed color coordinates of said digital color image correspond to respective chrominance and luminance coordinates of the color space into which said digital color image has been encoded.

10. A method according to claim 9, wherein said at least one prescribed color coordinate of the color space histogram generated in step (a) includes a chrominance coordinate.

11. A method according to claim 10, wherein the prescribed color coordinates of said digital color image correspond to a luminance and a pair of chrominance coordinates of the color space into which said digital color image has been encoded, and wherein said at least one prescribed color coordinate of the color space histogram generated in step (a) includes each of said chrominance coordinates.

12. A method according to claim 5, wherein the prescribed color coordinates of said digital color image correspond to a luminance coordinate and a pair of chrominance coordinates of the color space into which said digital color image has been encoded, and wherein each of the chrominance coordinates of the color space histogram generated in step (a) is prequantized to a digital resolution less than the digital resolution to which said digital color image is encoded, and said luminance coordinate of the color space histogram generated in step (a) has the same digital resolution as said digital color image.

13. A method according to claim 5, wherein the prescribed color coordinates of the color space of said digital color image correspond to a luminance coordinate and a pair of chrominance coordinates, and wherein said step (b) of performing sequential product code partitioning os said color space histogram along the respective luminance and chrominance coordinate axes thereof comprises sequentially splitting said chrominance coordinates and thereafter splitting said luminance coordinate.

14. A method according to claim 13, wherein step (b) comprises sequentially partitioning said luminance coordinate using a splitting criterion that depends upon spatial activity characteristics of said digital color image.

15. A method according to claim 5, wherein the coordinates of the color space of said digital color image correspond to a luminance coordinate and a pair of chrominance coordinates, and wherein said step (b) of performing sequential product code partitioning of said color space histogram comprises performing sequential binary splitting of the respective luminance and chrominance coordinate axes in accordance with a splitting criterion that depends upon the variance of the contents of said color space histogram for that portion of a respective axis to be split.

16. A method according to claim 5, including the preliminary step of subsampling said digital color image to provide a sub-array of digital color pixels and steps (a)-(c) are carried out with respect to the subsampled digital color image.

17. A method according to claim 5, wherein step (c) comprises, for each of the coordinates of said color space histogram, generating a respective look-up table that associates the digitized color composition for that respective coordinate of said digital color image with a quantized color space region.

18. A method according to claim 5, wherein step (a) comprises generating said color space histogram in the form of one-dimensional color space histograms of the color space activity of said digital color image, the composition of each one-dimensional color space histogram being referenced to a respective one of the color coordinates through which the color composition of said digital image is definable.

19. A method according to claim 18, wherein step (b) comprises performing sequential product code partitioning of said one-dimensional color space histograms along their respectively associated luminance and chrominance coordinate axes, so as to subdivide said color space histograms into a plurality of color space regions.

20. A method according to claim 5, wherein step (a) comprises generating a two-dimensional array of color space coordinate data entries, respective ones of which are associated with a range of color coordinate values of a further color space coordinate.

21. A method of generating a plurality of color codes, respective ones of which represent a color composition of a digital color image comprising an array of pixels, the color compositions of which are digitized to a prescribed color code resolution, said method comprising the steps of:

(a) generating a color space histogram of the color composition of the pixels of said digital color image in terms of prescribed color coordinates through which the color composition of said digital image is definable;

(b) quantizing the color composition of the color space histogram by performing sequential product code partitioning of said color space histogram along respective luminance and chrominance coordinate axes thereof into a plurality of color cells; and (c) for each of the color cells into which said color space histogram has been partitioned in step (b), generating a respective color code representative of the color space contents of that cell.

22. A method according to claim 21, wherein step (c) comprises generating a respective color code representative of the centroid of the color space contents of that cell.

23. A method according to claim 21, wherein step (c) comprises, for each of the coordinates of said color space histogram, generating a respective look-up table that associates the digitized color composition for that respective coordinate of said digital color image with a quantized coordinate value thereof.

24. A method according to claim 23, wherein step (c) comprises cascading the look-up tables together, and generating therefrom, in response to the color composition of a pixel of said digitized color image, a respective color code which is representative of the color composition of said digital color image.

25. A method according to claim 21, further including the step of (d) associating respective ones of the color codes generated in step (c) with pixels of an output image, which correspond spatially to the pixels of said digital color image.

26. A method according to claim 25, further including the step of (e) transforming the respective color codes of said output image into output color codes for application to a color image reproduction device through which a color output image is provided.

27. A method according to claim 21, wherein at least one of the coordinate axes of the color space histogram generated in step (a) is prequantized to a digital resolution less than the digital resolution to which said at least one of the color coordinates of said digital color image is encoded.

28. A method according to claim 27, wherein the coordinates of said digital color image correspond to respective chrominance and luminance coordinates of the color space into which said digital color image has been encoded.

29. A method according to claim 28, wherein the coordinates of said digital color image correspond to a luminance coordinate and a pair of chrominance coordinates of the color space into which said digital color image has been encoded, and wherein each of the chrominance coordinates of the color space histogram generated in step (a) is prequantized to a digital resolution less than the digital resolution to which said digital color image is encoded, and said luminance coordinate of the color space histogram generated in step (a) has the same digital resolution as said digital color image.

30. A method according to claim 21, wherein the coordinates of the color space of said digital color image correspond to a luminance coordinate and a pair of chrominance coordinates, and wherein said step (b) quantizing the color composition of the color space histogram by performing sequential product code partitioning of said color space histogram along the respective luminance and chrominance coordinate axes thereof comprises performing sequential binary splitting in accordance with a splitting criterion that depends upon the variance of the contents of said color space histogram for that portion of a respective axis to be split.

31. A method according to claim 30, wherein step (b) comprises sequentially partitioning said chrominance coordinates, and thereafter splitting said luminance coordinate.

32. A method according to claim 31, wherein step (b) comprises sequentially partitioning said luminance coordinate using a splitting criterion that depends upon spatial activity characteristics of said digital color image.

33. A method according to claim 21, wherein said step (b) of performing sequential product code partitioning of said color space histogram along respective coordinate axes thereof comprises performing sequential binary splitting of said axes along respective planes perpendicular to the respective axes being split.

34. A method according to claim 21, including the preliminary step of subsampling said digital color image for provide a sub-array of digital color pixels and steps (a)–(c) are carried out with respect to the subsampled digital color image.

35. A method according to claim 21, wherein step (a) comprises generating said color space histogram in the form of one-dimensional color space histograms of the color space activity of said digital color image, the composition of each one-dimensional color space histogram being referenced to a respective one of the color coordinates through which the color composition of said digital image is definable.

36. A method according to claim 35, wherein step (b) comprises performing sequential product code partitioning of said one-dimensional color space histograms along their respectively associated coordinate axes, so as to subdivide said one-dimensional color space histograms into a plurality of color cells.

37. A method according to claim 21, wherein step (a) comprises generating a two-dimensional array of color space coordinate data entries, respective ones of which are associated with a range of color coordinate values of a further color space coordinate.

38. An apparatus for quantizing a data vector structure having a multi-dimensional coordinate system, comprising a plurality of sequentially coupled look-up tables such that an output of an ith look-up table is a pointer to an entry in an (i+1)th look-up table, the respective look-up tables of said plurality being associated with the respective axes of said multi-dimensional coordinate system of said data vector structure, and wherein the output of the last look-up table in sequence is a multi-bit code representative of a quantized data structure value.

39. An apparatus according to claim 38, wherein said data vector structure is representative of a digital color image color space.

40. An apparatus according to claim 38, wherein said data vector structure is representative of respective luminance and chrominance coordinates of a digital color image color space.

41. An apparatus according to claim 38, wherein said data vector structure is representative of respective luminance and chrominance coordinates of a digital color image color space, and wherein an ith one of said look-up tables is associated with a chrominance coordinate of said digital color image color space and wherein an (i+j)th one of said look-up tables is associated with a luminance coordinate of said digital color image color space, and wherein the output of the last look-up table in sequence is a multi-bit code representative of a color of said digital image color space.

42. An apparatus according to claim 38, wherein said vector structure is representative of a digital color image color space, and wherein each look-up table is coupled to receive, as part of its entry pointer, a code representative of a prescribed quantization of a coordinate of said digital color image color space.

43. An apparatus according to claim 42, wherein said prescribed quantization of a coordinate of said digital color image color space corresponds to a sequential product code partitioning of said color space along that coordinate's axis into a plurality of color space regions.

44. An apparatus according to claim 38, wherein each look-up table is coupled to receive, as part of the entry pointer, a code representative of a prescribed quantization of a coordinate of said data vector structure, and wherein said prescribed quantization of a coordinate of said data vector structure corresponds to a sequential product code partitioning of said data vector structure along that coordinate's axis into a plurality of data vector structure regions.

45. A method of quantizing a data vector structure having a multi-dimensional coordinate system, comprising the steps of:
(a) providing a plurality of look-up tables, a respective look-up table of said plurality being associated with a respective axis of said multi-dimensional coordinate system of said data vector structure; and
(b) sequentially coupling said look-up tables together such that an output of an ith look-up table is a pointer to an entry in an (i+l)th look-up table, whereby output of the last look-up table in sequence is a multi-bit code representative of a quantized data structure value.

46. A method apparatus according to claim 45, wherein each look-up table is coupled to receive, as part of its entry pointer, a code representative of a prescribed quantization of a coordinate of said data vector structure, and wherein said prescribed quantization of a coordinate of said data vector structure corresponds to a sequential product code partitioning of said data vector structure along that coordinate's axis into a plurality of data vector structure regions.

47. A method according to claim 45, wherein said data vector structure is representative of a digital color image color space.

48. A method according to claim 45, wherein said data vector structure is representative of respective luminance and chrominance coordinates of a digital color image color space.

49. A method according to claim 45, wherein said data vector structure is representative of respective luminance and chrominance coordinates of a digital color image color space, and wherein an ith one of said look-up tables is associated with a chrominance coordinate of said digital color image color space and wherein an (i+j)th one of said look-up tables is associated with a luminance coordinate of said digital color image color space, and wherein the output of the last look-up table in sequence is a multi-bit code representative of a color of said digital image color space.

50. A method according to claim 45, wherein said vector structure is representative of a digital color image color space, and wherein each look-up table is coupled to receive, as part of the entry pointer, a code representative of a prescribed quantization of a coordinate of said digital color image color space.

51. For use with a digital color image comprised of an array of pixels the color compositions of which are digitized to a prescribed color code resolution, a method of quantizing a multi-dimensional color space structure through which the color compositions of the pixels of said array are definable, comprising the steps of:
(a) providing a multi-dimensional data structure representative of the multi-dimensional color space of said digital color image; and
(b) performing sequential product code partitioning of said multi-dimensional data structure along at least one of respective coordinate axes thereof into a plurality of color cells.

52. A method according to claim 51, wherein step (b) comprises performing sequential product code partitioning of said multi-dimensional data structure along each of its respective coordinate axes into a plurality of multi-dimensional color cells.

53. A method according to claim 52, wherein step (a) comprises providing a luminance, chrominance data structure associated with a luminance, chrominance color space representative of said digital color image, and wherein step (b) comprises performing sequential product code partitioning of said luminance, chrominance data structure along each of the respective chrominance and luminance coordinate axes into a plurality of luminance-chrominance cells, each of which is associated with a quantized value of said digital color image.

54. A method according to claim 51, further including the step (c) of, for each of the cells into which said data structure has been partitioned in step (b), generating a respective color code representative of the color space contents of that cell.

55. A method according to claim 54, wherein step (c) comprises generating a respective color code representative of the centroid of the color space contents of that cell.

56. A method according to claim 54, wherein step (c) comprises, for each of the coordinates of said data structure, generating a respective look-up table that associates the digitized color composition for that respective coordinate of said digital color image with its quantized coordinate value.

57. A method according to claim 56, wherein step (c) comprises sequentially coupling the look-up tables together, and generating therefrom, in response to the color composition of a pixel of said digitized color image, a respective color code which is representative of the color composition of said digital color image.

58. A method according to claim 51, wherein at least one of the coordinate axes of the multi-dimensional data structure provided in step (a) is prequantized to a digital precision less than the digital precision to which at least one of the color coordinates of said digital color image is encoded.

59. A method according to claim 58, wherein a prequantized coordinate axis corresponds to a coordinate axis of said multi-dimensional data structure where the sensitivity of the human visual system is reduced in comparison to another coordinate axis of said multi-dimensional data structure.

60. A method according to claim 59, wherein a prequantized coordinate axis corresponds to a chrominance coordinate axis of a luminance-chrominance data structure where the sensitivity of the human visual system is reduced in comparison to a luminance coordinate axis of said data structure.

61. In a method of quantizing the color composition of a digital color image comprised of an array of pixels which are digitized to a prescribed color code precision, the improvement comprising providing a multi-dimensional data structure representative of the multi-dimensional color space of said digital color image, and wherein at least one of the coordinates of said multi-dimensional data structure is prequantized to a digital code precision less than the digital code precision to which at least one of the color coordinates of said digital color image is encoded.

62. The improvement according to claim 61, wherein a prequantized coordinate axis corresponds to a coordinate axis of said multi-dimensional data structure where the sensitivity of the human visual system is reduced in comparison to another coordinate axis of said multi-dimensional data structure.

63. The improvement according to claim 61, wherein a prequantized coordinate axis corresponds to a chrominance coordinate axis of a luminance-chrominance data structure where the sensitivity of the human visual system is reduced in comparison to a luminance coordinate axis of said data structure.

64. For use with a digital color image comprised of an array of pixels the color compositions of which are digitized to a prescribed color code resolution, a method of quantizing a multi-dimensional color space structure through which the color compositions of the pixels of said array are definable, comprising the steps of:

(a) providing a multi-dimensional data structure representative of the multi-dimensional color space of said digital color image; and (b) partitioning said multi-dimensional data structure along one of its respective coordinate axes thereof into a plurality of color cells using an axis-splitting criterion that depends upon spatial activity characteristics of said digital color image along that axis.

65. A method according to claim 64, wherein step (a) comprises providing a luminance, chrominance data structure associated with a luminance, chrominance color space representative of said digital color image, and wherein step (b) comprises performing sequential product code partitioning of said luminance, chrominance data structure along each of its respective chrominance and luminance coordinate axes into a plurality of luminance-chrominance cells, each of which is associated with a quantized value of said digital color image, and wherein the partitioning of said multi-dimensional data structure along its luminance coordinate axes into a plurality of color cells employs an axis-splitting criterion that depends upon spatial activity characteristics of said digital color image along the luminance axis.

66. A method according to claim 64, wherein the coordinates of the color space of said digital color image correspond to a luminance coordinate and a pair of chrominance coordinates, and wherein step (b) comprises partitioning the corresponding luminance-chrominance data structure by sequential product code partitioning of said data structure along its respective coordinate luminance and chrominance axes, in accordance with a splitting criterion that depends upon the variance of the contents of said data structure for that portion of a respective axis to be split, and such that the partitioning of said luminance-chrominance data structure along its luminance coordinate axis into a plurality of color cells employs an axis-splitting criterion that depends upon spatial activity weighting of the variance of the contents of said data structure along the luminance axis.

67. A method of quantizing a multi-coordinate data vector structure comprising the steps of:

(a) generating a first one-dimensional data vector structure by projecting components of said multi-coordinate data structure onto a first coordinate axis thereof;

(b) iteratively partitioning said first one-dimensional data vector structure into a first plurality of one-dimensional data vector structure regions;

(c) for each of the first plurality of one-dimensional data vector structure regions partitioned in step (b), generating a respective associated second one-dimensional data vector structure by projecting components of said multi-coordinate data structure contained within said first plurality of one-dimensional data vector structure regions onto a second coordinate axis of said multi-dimensional data vector structure; and (d) iteratively partitioning the second one-dimensional data vector structures generated in step (c) into a second plurality of one-dimensional data vector structure regions.

68. A method according to claim 67, further including the step of (e) generating a plurality of codes respectively associated with each of said second plurality of one-dimensional data vector structure regions iteratively partitioned in step (d).

69. A method according to claim 67, further including the steps of:

(e) for each of the second plurality of one-dimensional data vector structure regions partitioned in step (d), generating a respective associated third one-dimensional data vector structure by projecting components of said multi-coordinate data structure contained within said second plurality of one-dimensional data vector structure regions onto a third coordinate axis of said multi-dimensional data vector structure; and (f) iteratively partitioning the third one-dimensional data vector structures generated in step (e) into a third plurality of one-dimensional data vector structure regions.

70. A method according to claim 69, further including the step of (g) generating a plurality of codes respectively associated with each of the third plurality of one-dimensional data vector structure regions iteratively partitioned in step (f).

71. A method according to claim 67, wherein said multi-coordinate data vector structure comprises a multi-dimensional color space structure through which the color compositions of the pixels of a digital color image comprised of an array of pixels the color compositions of which are digitized to a prescribed color code resolution.

72. A method according to claim 71, wherein said multi-coordinate data vector structure comprises a three-dimensional luminance-chrominance histogram through which the color compositions of the pixels of a digital color image comprised of an array of pixels the color compositions of which are digitized to a prescribed color code resolution.

73. A method according to claim 72, wherein step (a) comprises generating a first one-dimensional luminance-chrominance histogram by projecting components of said luminance-chrominance histogram onto a first chrominance axis thereof, step (b) comprises iteratively partitioning said first one-dimensional luminance-chrominance histogram into a first plurality of one-dimensional luminance-chrominance regions, step (c) comprises generating a respective associated second one-dimensional luminance-chrominance histogram by projecting components of said luminance-chrominance histogram contained within said first plurality of one-dimensional luminance-chrominance histogram regions onto a second chrominance axis of said three-dimensional luminance-chrominance histogram, for each of the first plurality of one-dimensional luminance-chrominance histogram regions partitioned in step (b), and wherein step (d) comprises iteratively partitioning the second one-dimensional luminance-chrominance histograms generated in step (c) into a second plurality of one-dimensional luminance-chrominance histogram regions.

74. A method according to claim 73, further including the steps of:

(e) for each of the second plurality of one-dimensional luminance-chrominance histogram regions partitioned in step (d), generating a respective associated third one-dimensional luminance-chrominance histogram by projecting components of said luminance-chrominance coordinate data structure contained within said second plurality of one-dimensional luminance-chrominance histogram regions onto the luminance axis of said three-dimensional luminance-chrominance histogram; and (f) iteratively partitioning the third one-dimensional luminance-chrominance histograms generated in step (e) into a third plurality of one-dimensional luminance-chrominance histogram regions.

75. A method according to claim 74, wherein each of steps (b), (d) and (f) comprises partitioning a corresponding one-dimensional luminance-chrominance histogram by sequential product code partitioning of said one-dimensional luminance-chrominance histogram in accordance with a splitting criterion that depends upon the variance of the contents of said one-dimensional histogram for that portion of a respective axis to be split, and such that the partitioning of said third one-dimensional luminance-chrominance histogram along the luminance coordinate axis into a plurality of color cells employs an axis-splitting criterion that depends upon spatial activity weighting of the variance of the contents of said luminance-chrominance histogram along the luminance axis.

76. A method of quantizing a multi-coordinate data vector structure comprising the steps of:

(a) generating a two-dimensional array of data vector entries, respective ones of which are associated with data structures of a third coordinate of said multi-coordinate data vector structure; and (b) for a respective data entry of said multi-coordinate data structure accessing said two-dimensional array of data vector entries and locating, along said third coordinate, a corresponding value of said data entry.

77. A method according to claim 76, wherein step (a) comprises storing an entry value of said third coordinate of said data structure as a binary tree structure, and wherein step (b) comprises locating said corresponding value of said data entry by conducting a binary search along said third coordinate of said two-dimensional array.

78. A method according to claim 76, wherein said multi-coordinate data vector structure comprises a digital color image color space, and each entry of said two-dimensional array is a look-up table of color data covering the range of luminance values for a respective chrominance coordinate location of said color space.

79. A method according to claim 76, wherein at least one of the color coordinates of the two-dimensional array is prequantized to a digital precision less than the digital precision to which color coordinates of said digital color image are encoded.

80. A method according to claim 79, wherein step (a) comprises storing an entry value of said third coordinate of said data structure as a binary tree structure, and wherein step (b) comprises locating said corresponding value of said data entry by conducting a binary search along said third coordinate of said two-dimensional array.

* * * * *

UNITED STATES PATENT AND TRADEMARK OFFICE
CERTIFICATE OF CORRECTION

PATENT NO.   : 5,544,284
DATED        : August 6, 1996
INVENTOR(S)  : Jan P. Allebach, et al It is certified that error appears in the above-indentified patent and that said Letters Patent is hereby corrected as shown below:

Column 22, line 22, "os" should be --of--.

Signed and Sealed this

Twenty-fourth Day of December, 1996

Attest:

BRUCE LEHMAN

*Attesting Officer*            *Commissioner of Patents and Trademarks*